US012297780B2

(12) United States Patent
Okui

(10) Patent No.: US 12,297,780 B2
(45) Date of Patent: May 13, 2025

(54) GAS TURBINE PLANT, METHOD FOR OPERATING SAME, AND METHOD FOR MODIFYING SAME

(71) Applicant: MITSUBISHI HEAVY INDUSTRIES, LTD., Tokyo (JP)

(72) Inventor: Hidetaka Okui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/712,427

(22) PCT Filed: Apr. 5, 2022

(86) PCT No.: PCT/JP2022/017100
§ 371 (c)(1),
(2) Date: May 22, 2024

(87) PCT Pub. No.: WO2023/095361
PCT Pub. Date: Jun. 1, 2023

(65) Prior Publication Data
US 2025/0012222 A1    Jan. 9, 2025

(30) Foreign Application Priority Data

Nov. 29, 2021 (JP) .................................. 2021-192907

(51) Int. Cl.
*F02C 9/00* (2006.01)
*F02C 6/18* (2006.01)
(Continued)

(52) U.S. Cl.
CPC .................. *F02C 9/18* (2013.01); *F02C 6/18* (2013.01); *F02C 7/057* (2013.01); *F02C 7/141* (2013.01);
(Continued)

(58) Field of Classification Search
None
See application file for complete search history.

(56) References Cited

U.S. PATENT DOCUMENTS 3,229,459 A  *  1/1966  Cervenka ............. B64G 1/4005
                                                    60/803
2003/0101728 A1 *  6/2003  Wakana ................. F25J 1/0251
                                                    60/727

FOREIGN PATENT DOCUMENTS

JP    50-153120    12/1975
JP    4-153527    5/1992
(Continued)

OTHER PUBLICATIONS

International Search Report issued Jun. 28, 2022 in International Application No. PCT/JP2022/017100, with English Translation.
(Continued)

*Primary Examiner* — Edwin Kang
(74) *Attorney, Agent, or Firm* — Wenderoth, Lind & Ponack, L.L.P.

(57) ABSTRACT

A gas turbine plant includes a gas turbine, a liquefaction facility capable of liquefying air, and a liquefaction controller. A compressor has an intake amount adjuster capable of adjusting an intake amount into a compressor casing. The liquefaction facility includes: a bleed line capable of bleeding compressed air from the compressor; a liquefaction system capable of liquefying the compressed air, a bleed amount adjustment valve; a return air line capable of guiding return air into a flow passage through which compressed air flows in the gas turbine; and a return amount adjusting valve. The liquefaction controller opens the bleed amount adjustment valve if an opening degree of the intake amount adjuster is a first opening degree, and opens the return amount adjusting valve if the opening degree of the intake
(Continued)

amount adjuster is a second opening degree, which is an opening degree greater than the first opening degree.

18 Claims, 7 Drawing Sheets

(51) Int. Cl.
*F02C 7/057* (2006.01)
*F02C 7/141* (2006.01)
*F02C 9/18* (2006.01)
*F25J 1/00* (2006.01)
*F25J 1/02* (2006.01)

(52) U.S. Cl.
CPC ........... *F25J 1/0012* (2013.01); *F25J 1/0283* (2013.01); *F05D 2260/232* (2013.01); *F25J 2230/22* (2013.01); *F25J 2230/40* (2013.01)

(56) References Cited

FOREIGN PATENT DOCUMENTS

| | | |
|---|---|---|
| JP | 2001-200731 | 7/2001 |
| JP | 3211942 | 9/2001 |
| JP | 2001-323807 | 11/2001 |

OTHER PUBLICATIONS

Written Opinion of the International Searching Authority issued Jun. 28, 2022 in International Application No. PCT/JP2022/017100, with English Translation.

\* cited by examiner

GAS TURBINE PLANT, METHOD FOR OPERATING SAME, AND METHOD FOR MODIFYING SAME

TECHNICAL FIELD

The present disclosure relates to a gas turbine plant, a method for operating a gas turbine plant, and a method for modifying a gas turbine plant.

This application claims the right of priority based on Japanese Patent Application No. 2021-192907 filed with the Japan Patent Office on Nov. 29, 2021, the content of which is incorporated herein by reference.

BACKGROUND ART

A gas turbine includes a compressor that compresses air, a combustor that burns fuel in the air compressed by the compressor to generate a combustion gas, and a turbine that is driven by the combustion gas.

The following PTL 1 discloses a technique for increasing a gas turbine output. In this technique, air compressed by a compressor is liquefied by a liquefaction device, and liquid air, which is the liquefied air, is stored in a tank. Then, at a peak load of a gas turbine, the liquid air in the tank is heated and vaporized, and this air is introduced into a combustor. In this technique, at the peak load of the gas turbine, in addition to the air from the compressor, vaporized air of the liquid air is introduced into the combustor, so that it is possible to increase the gas turbine output at the peak load of the gas turbine.

CITATION LIST

Patent Literature

[PTL 1] Japanese Unexamined Patent Application Publication No. S50-153120

SUMMARY OF INVENTION

Technical Problem

An operator of a gas turbine plant is required to vary a gas turbine output according to load fluctuation in an electric power system. Therefore, it is desired that gas turbine output adjustment can be flexibly performed.

Therefore, an object of the present disclosure is to provide a technique capable of flexibly performing gas turbine output adjustment.

Solution to Problem

A gas turbine plant as an aspect for achieving the above object includes:
  a gas turbine that includes a compressor capable of compressing air, a combustor capable of generating a combustion gas by burning fuel in compressed air that is air compressed by the compressor, and a turbine capable of being driven by the combustion gas; a liquefaction facility capable of liquefying gaseous air; and a liquefaction controller that controls the liquefaction facility. The compressor includes a compressor rotor rotatable around an axis line, a compressor casing that covers an outer periphery of the compressor rotor, a plurality of stator blades provided on an inner periphery side of the compressor casing, and an intake air amount regulator capable of regulating an intake air amount, which is a flow rate of air flowing into the compressor casing, by an opening and closing operating. The liquefaction facility includes a bleed air line capable of bleeding part of the compressed air from the compressor, a liquefaction system capable of liquefying the compressed air flowing through the bleed air line, a bleed air amount regulating valve capable of regulating a flow rate of the compressed air flowing through the bleed air line, a liquid air tank capable of storing liquid air which is the compressed air liquefied in the liquefaction system, a return air line capable of leading return air, which is the liquid air in the liquid air tank or vaporized air obtained by vaporization of the liquid air, to a flow path through which air or compressed air flows in the gas turbine, or to a high-temperature part which comes into contact with the combustion gas, among parts configuring the gas turbine, and a return amount regulating valve capable of regulating a flow rate of the return air flowing through the return air line. The liquefaction controller is configured to lead the compressed air to the liquefaction system by opening the bleed air amount regulating valve when an opening degree of the intake air amount regulator is a first opening degree or when a parameter having a correlation with the opening degree is a value corresponding to the first opening degree, and lead the return air to the gas turbine by opening the return amount regulating valve when the opening degree of the intake air amount regulator is a second opening degree, which is an opening degree larger than the first opening degree, or when the parameter is a value corresponding to the second opening degree. The first opening degree is an opening degree when the amount of intake air flowing into the compressor casing is made smaller than the amount of intake air when an output of the gas turbine is a rated output.

In this aspect, part of the compressed air from the compressor is bled to the liquefaction facility at the first opening degree when the intake air amount is made smaller than the intake air amount when the output of the gas turbine is the rated output. Therefore, the flow rate of the compressed air flowing into the combustor from the intermediate casing decreases. Therefore, in this aspect, the flow rate of the combustion gas that is generated in the combustor becomes smaller than in a case where the compressed air from the compressor is not bled at the first opening degree, and the gas turbine output decreases.

Further, in this aspect, at the second opening degree which is an opening degree larger than the first opening degree, the return air, which is the liquid air in the liquid air tank or vaporized air of the liquid air, is led to a flow path through which air or compressed air flows in the gas turbine, or to the high-temperature part which comes into contact with the combustion gas, among parts configuring the gas turbine. For example, in a case where at the second opening degree, the return air is led to the flow path through which air or compressed air flows in the gas turbine, the flow rate of the combustion gas that is generated in the combustor becomes larger than in a case where the return air is not led to the flow path, and the gas turbine output increases. Further, in a case where at the second opening degree, the return air is led to the high-temperature part of the gas turbine, the flow rate of the compressed air for cooling the high-temperature part becomes smaller than in a case where the return air is not led to the high-temperature part, the flow rate of the compressed air flowing into the combustor increases, and the gas turbine output increases.

Therefore, in this aspect, it is possible to flexibly perform gas turbine output adjustment and to flexibly cope with load fluctuations in an electric power system.

A method for operating a gas turbine plant as an aspect for achieving the above object is applied to the following gas turbine plant.

The gas turbine plant includes a gas turbine. The gas turbine includes a compressor capable of compressing air, a combustor capable of generating a combustion gas by burning fuel in compressed air that is air compressed by the compressor, and a turbine capable of being driven by the combustion gas. The compressor includes a compressor rotor rotatable around an axis line, a compressor casing that covers an outer periphery of the compressor rotor, a plurality of stator blades provided on an inner periphery side of the compressor casing, and an intake air amount regulator capable of regulating an intake air amount, which is a flow rate of air flowing into the compressor casing, by an opening and closing operating.

The operating method includes a bleeding step of bleeding part of the compressed air from the compressor, a liquefaction step of liquefying the compressed air bled in the bleeding step to generate liquid air, and a return step of leading return air, which is the liquid air or vaporized air obtained by vaporization of the liquid air, to a flow path through which air or compressed air flows in the gas turbine, or to a high-temperature part which comes into contact with the combustion gas, among parts configuring the gas turbine. When an opening degree of the intake air amount regulator is a first opening degree or when a parameter having a correlation with the opening degree is a value corresponding to the first opening degree, the bleeding step and the liquefaction step are executed, and when the opening degree of the intake air amount regulator is a second opening degree larger than the first opening degree or when the parameter is a value corresponding to the second opening degree, the return step is executed. The first opening degree is an opening degree when the amount of intake air flowing into the compressor casing is made smaller than the amount of intake air when an output of the gas turbine is a rated output.

By performing the operating method of this aspect, as with the gas turbine plant in an aspect described above, it is possible to flexibly perform gas turbine output adjustment and to flexibly cope with load fluctuations in electric power system.

A method for modifying a gas turbine plant as an aspect for achieving the above object is applied to the following gas turbine plant.

The gas turbine plant includes a gas turbine. The gas turbine includes a compressor capable of compressing air, a combustor capable of generating a combustion gas by burning fuel in compressed air that is air compressed by the compressor, and a turbine capable of being driven by the combustion gas. The compressor includes a compressor rotor rotatable around an axis line, a compressor casing that covers an outer periphery of the compressor rotor, a plurality of stator blades provided on an inner periphery side of the compressor casing, and an intake air amount regulator capable of regulating an intake air amount, which is a flow rate of air flowing into the compressor casing, by an opening and closing operating.

The modifying method includes a step of adding a liquefaction facility capable of liquefying gaseous air and a liquefaction controller capable of controlling the liquefaction facility. The liquefaction facility that is added in the step includes a bleed air line capable of bleeding part of the compressed air from the compressor, a liquefaction system capable of liquefying the compressed air flowing through the bleed air line, a liquid air tank capable of storing liquid air which is the compressed air liquefied in the liquefaction system, a bleed air amount regulating valve capable of regulating a flow rate of the compressed air flowing through the bleed air line, a return air line capable of leading return air, which is the liquid air in the liquid air tank or vaporized air obtained by vaporization of the liquid air, to a flow path through which air or compressed air flows in the gas turbine, or to a high-temperature part which comes into contact with the combustion gas, among parts configuring the gas turbine, and a return amount regulating valve capable of regulating a flow rate of the return air flowing through the return air line. The liquefaction controller that is added in the step is configured to lead the compressed air to the liquefaction system by opening the bleed air amount regulating valve when an opening degree of the intake air amount regulator is a first opening degree or when a parameter having a correlation with the opening degree is a value corresponding to the first opening degree, and lead the return air to the gas turbine by opening the return amount regulating valve when the opening degree of the intake air amount regulator is a second opening degree, which is an opening degree larger than the first opening degree, or when the parameter is a value corresponding to the second opening degree. The first opening degree is an opening degree when the amount of intake air flowing into the compressor casing is made smaller than the amount of intake air when an output of the gas turbine is a rated output.

In the gas turbine plant modified by the modifying method of this aspect, as with the gas turbine plant in an aspect described above, it is possible to flexibly perform gas turbine output adjustment and to flexibly cope with load fluctuations in an electric power system.

Advantageous Effects of Invention

In an aspect of the present disclosure, it is possible to flexibly perform gas turbine output adjustment and to flexibly cope with load fluctuations in an electric power system.

DESCRIPTION OF EMBODIMENTS

Hereinafter, various embodiments and various modification examples of a gas turbine plant according to the present disclosure will be described using the drawings.

First Embodiment

Hereinafter, a first embodiment of the gas turbine plant according to the present disclosure will be described using FIGS. 1 to 3.

Figure 1:
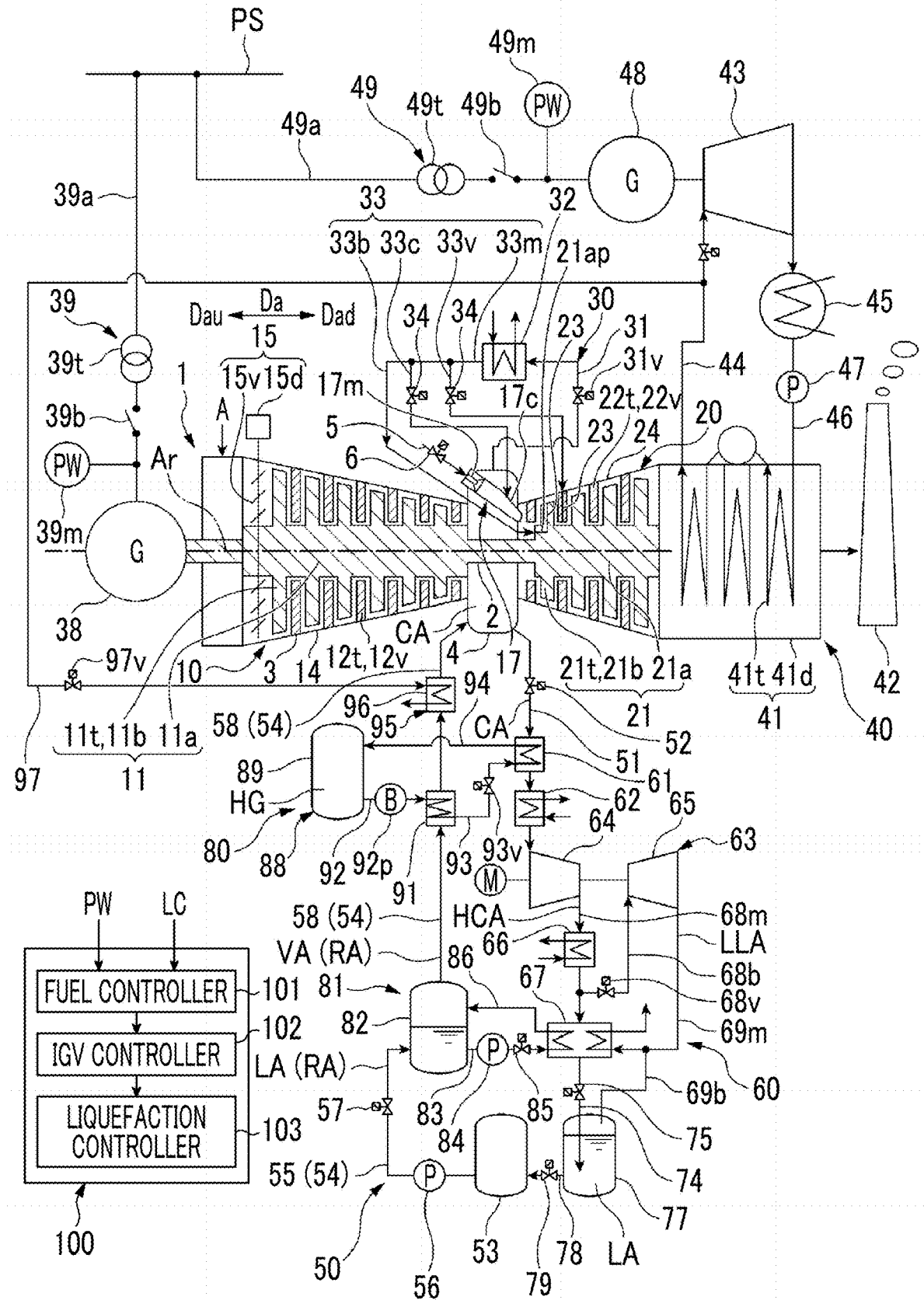
FIG. 1 is a system diagram of a gas turbine plant in a first embodiment of the present disclosure.

As shown in FIG. 1, the gas turbine plant of the preset embodiment includes a gas turbine 1, a GT generator 38 that generates electric power by driving the gas turbine 1, a GT power supply facility 39 that can supply the electric power from the GT generator 38 to an electric power system PS, a turbine cooling device 30, an exhaust heat utilization facility 40 that utilizes the heat of an exhaust gas exhausted from the gas s turbine 1, a liquefaction facility 50 that can liquefy gaseous air, and a control device 100.

The gas turbine 1 includes a compressor 10 that compresses air A, a combustor 17 that burns fuel in compressed air CA, which is air compressed by the compressor 10, to generate a combustion gas, and a turbine 20 that is driven by a high-temperature and high-pressure combustion gas.

The compressor 10 includes a compressor rotor 11 that rotates around a rotor axis line Ar, a compressor casing 14 that covers the compressor rotor 11, a plurality of stator blade rows 12t, and an intake air amount regulator (hereinafter referred to as an inlet guide vane (IGV) 15. Here, the direction in which the rotor axis line Ar extends is defined as an axis line direction Da, one side of both sides in the axis line direction Da is defined as an axis line upstream side Dau, and the other side is defined as an axis line downstream side Dad.

The compressor rotor 11 includes a compressor rotor shaft 11a that is centered on the rotor axis line Ar and extends in the axis line direction Da, and a plurality of rotor blade rows 11t fixed to the compressor rotor shaft 11a. The plurality of rotor blade rows 11t are arranged in the axis line direction Da. Each of the plurality of rotor blade rows 11t includes a plurality of rotor blades 11b arranged in a circumferential direction with respect to the rotor axis line Ar. Each of the plurality of stator blade rows 12t is disposed on the axis line downstream side Dad of each of the plurality of rotor blade rows 11t. Each of the plurality of stator blade rows 12t includes a plurality of stator blades 12v arranged in the circumferential direction with respect to the rotor axis line Ar. The plurality of stator blades 12v are fixed to an inner periphery-side portion of the compressor casing 14.

The IGV 15 includes a plurality of guide vanes 15v disposed on the axis line upstream side Dau with respect to the plurality of rotor blade rows 11t in the compressor casing 14, and a driver 15d that opens and closes the plurality of guide vanes 15v. The IGV 15 can regulate the amount of intake air, which is the flow rate of air flowing into the compressor casing 14.

The turbine 20 is disposed on the axis line downstream side Dad of the compressor 10. The turbine 20 includes a turbine rotor 21 that rotates around the rotor axis line Ar by the combustion gas from the combustor 17, a turbine casing 24 that covers the turbine rotor 21, and a plurality of stator blade rows 22t.

The turbine rotor 21 includes a turbine rotor shaft 21a that is centered on the rotor axis line Ar and extends in the axis line direction Da, and a plurality of rotor blade rows 21t fixed to the turbine rotor shaft 21a. The plurality of rotor blade rows 21t are arranged in the axis line direction Da. Each of the plurality of rotor blade rows 21t includes a plurality of rotor blades 21b arranged in the circumferential direction with respect to the rotor axis line Ar. Each of the plurality of stator blade rows 22t is disposed on the axis line upstream side Dau of each of the plurality of rotor blade rows 21t. Each of the plurality of stator blade rows 22t includes a plurality of stator blades 22v arranged in the circumferential direction with respect to the rotor axis line Ar. The plurality of stator blades 22v are fixed to an inner periphery-side portion of the turbine casing 24.

The turbine rotor 21 and the compressor rotor 11 are connected to each other so as to be able to integrally rotate around the same rotor axis line Ar, thereby forming a gas turbine rotor 2. A rotor of the GT generator 38 is connected to the gas turbine rotor 2.

The gas turbine 1 further includes an intermediate casing 4. The intermediate casing 4 is disposed between the compressor casing 14 and the turbine casing 24 in the direction in which the rotor axis line Ar extends, and connects the compressor casing 14 and the turbine casing 24. A gas turbine casing 3 includes the compressor casing 14, the intermediate casing 4, and the turbine casing 24. The compressed air CA discharged from the compressor 10 flows into the intermediate casing 4. The combustor 17 is fixed to the intermediate casing 4. A fuel line 5 is connected to the combustor 17. The fuel line 5 is provided with a fuel regulating valve 6 that regulates the flow rate of fuel flowing through the fuel line 5. The combustor 17 includes a combustion tube (or a transition piece) 17c and a fuel nozzle 17m that injects fuel into the combustion tube 17c.

The GT power supply facility 39 includes a GT power line 39a that electrically connects the GT generator 38 and the electric power system PS, and a GT circuit breaker 39b and a GT transformer 39t provided in the GT power line 39a. The GT power line 39a is provided with a GT wattmeter 39m that measures the electric power flowing through the GT power line 39a.

The turbine cooling device 30 includes a cooling bleed air line 31, a cooler 32, and a cooling air line 33. The cooling bleed air line 31 can bleed the compressed air CA from the compressor 10. Therefore, one end of the cooling bleed air line 31 is connected to the intermediate casing 4 that forms a flow path through which the compressed air CA from the compressor 10 flows. The cooling bleed air line 31 is provided with a cooling bleed air amount regulating valve 31v that regulates the flow rate of the compressed air CA flowing through a bleed air line 51. The cooler 32 is connected to the other end of the cooling bleed air line 31 and cools the compressed air CA flowing in through the bleed air line 51. The cooling air line 33 is connected to the cooler 32, and cooling air, which is the compressed air CA cooled by the cooler 32, flows through the cooling air line 33. The cooling air line 33 includes a main cooling air line 33m, a combustor cooling air line 33c, a rotor blade cooling air line 33b, and a stator blade cooling air line 33v. All of the combustor cooling air line 33c, the rotor blade cooling air line 33b, and the stator blade cooling air line 33v are lines branched from the main cooling air line 33m.

Among parts configuring the gas turbine 1, all of the combustion tube 17c of the combustor 17 and the plurality of rotor blades 21b and the plurality of stator blades 22v of the turbine 20 are high-temperature parts with which the combustion gas come into contact. Cooling air passages 23, which pass through these high-temperature parts and are open at the surfaces of the high-temperature parts, which come into contact with the combustion gas, are formed in these high-temperature parts. A cooling air passage 21ap, which passes through the turbine rotor shaft 21a and communicates with the cooling air passage 23 of one of the plurality of rotor blades 21b, is formed in the turbine rotor shaft 21a.

The combustor cooling air line 33c is connected to the cooling air passage of the combustion tube 17c, which is a type of high-temperature part. The rotor blade cooling air line 33b is connected to the cooling air passage 23 of the rotor blade 21b, which is a type of high-temperature part, through the cooling air passage 21ap of the turbine rotor shaft 21a. The stator blade cooling air line 33v is connected to the cooling air passage 23 of one of the plurality of stator blades 22v.

In the present embodiment, cooling air regulating valves 34 are provided in the combustor cooling air line 33c and the stator blade cooling air line 33v, among the combustor cooling air line 33c, the rotor blade cooling air line 33b, and the stator blade cooling air line 33v. However, it is sufficient if the cooling air regulating valves 34 are provided in any two of the combustor cooling air line 33c, the rotor blade cooling air line 33b, and the stator blade cooling air line 33v. The turbine cooling device 30 of the present embodiment supplies cooling air to all of the combustion tube 17c of the combustor 17, and the plurality of rotor blades 21b and the plurality of stator blades 22v of the turbine 20, and cools all of these high-temperature parts. However, the turbine cooling device 30 may supply cooling air to only one high-temperature part among the combustion tube 17c of the combustor 17 and the plurality of rotor blades 21b and the plurality of stator blades 22v of the turbine 20, and cool only the one high-temperature part.

The exhaust heat utilization facility 40 includes an exhaust heat recovery boiler 41, a chimney 42, a steam turbine 43 that is driven by the steam from the exhaust heat recovery boiler 41, a main steam line 44 that can lead the steam generated in the exhaust heat recovery boiler 41 to the steam turbine 43, a condenser 45 that returns the steam exhausted from the steam turbine 43 to water, a water supply line 46 that can lead water in the condenser 45 to the exhaust heat recovery boiler 41, a water supply pump 47 provided in the water supply line 46, an ST generator 48 that generates electricity by driving of the steam turbine 43, and an ST power supply facility 49 that can supply the electric power from the ST generator 48 to the electric power system PS.

The exhaust heat recovery boiler 41 can evaporate water into steam by using the heat of an exhaust gas, which is the combustion gas exhausted from the turbine 20. The exhaust heat recovery boiler 41 includes a duct 41d connected to the turbine casing 24, and a heat transfer tube 41t disposed within the duct 41d. The exhaust gas from the turbine 20 flows into the duct 41d. Further, liquid water or gaseous water flows in the heat transfer tube 41t. One end of the heat transfer tube 41t forms a water inlet and is connected to the water supply line 46. Further, the other end of the heat transfer tube 41t forms a steam outlet and is connected to the main steam line 44. The chimney 42 is connected to the duct 41d of the exhaust heat recovery boiler 41.

The ST power supply facility 49 includes an ST power line 49a that electrically connects the ST generator 48 and the electric power system PS, and an ST circuit breaker 49b and an ST transformer 49t provided in the ST power line 49a. The ST power line 49a is provided with an ST wattmeter 49m that measures electric power flowing through the ST power line 49a.

The liquefaction facility 50 includes the bleed air line 51, a bleed air amount regulating valve 52, a liquefaction system 60, a liquid air tank 53, a heating system 80, a return air line 54, a liquid air pump 56, and a return amount regulating valve 57.

The bleed air line 51 can bleed part of the compressed air CA from the compressor 10. Therefore, one end of the bleed air line 51 is connected to the intermediate casing 4 that forms a flow path through which the compressed air CA from the compressor 10 flows. The bleed air amount regulating valve 52 is provided in the bleed air line 51. The bleed air amount regulating valve 52 can regulate the flow rate of the compressed air CA flowing through the bleed air line 51.

The liquefaction system 60 includes a primary cooler (a second cooling heat exchanger) 61, a secondary cooler 62, a cooling device 63, a gas-liquid separation tank 77, a liquid air supply line 78, and a liquid air supply regulating valve 79.

The cooling device 63 can cool the compressed air CA from the bleed air line 51. The cooling device 63 includes a boost compressor 64, an expansion turbine 65, a tertiary cooler 66, a quaternary cooler (a first cooling heat exchanger) 67, a highly compressed air main line 68m, a highly compressed air branch line 68b, a highly compressed air regulating valve 68v, a low-temperature and low-pressure air main line 69m, a low-temperature and low-pressure air branch line 69b, a gas-liquid mixing line 74, and an expansion valve 75.

The other end of the bleed air line 51 described above is connected to a suction port of the boost compressor 64. The boost compressor 64 can further compress the compressed air CA from the bleed air line 51 to generate highly compressed air HCA. A discharge port of the boost compressor 64 and a highly compressed air inlet of the quaternary cooler 67 are connected by the highly compressed air main line 68m. The tertiary cooler 66 capable of performing heat exchange between the highly compressed air HCA and a cooling medium such as seawater, river water, or underground water is provided in the highly compressed air main line 68m. The highly compressed air branch line 68b is a line branched from a position between the tertiary cooler 66 and the quaternary cooler 67 in the highly compressed air main line 68m. The highly compressed air branch line 68b is connected to a suction port of the expansion turbine 65. The highly compressed air branch line 68b is provided with the highly compressed air regulating valve 68v that regulates the flow rate of the highly compressed air HCA flowing through the highly compressed air branch line 68b. The expansion turbine 65 can adiabatically expand the highly compressed air HCA from the highly compressed air branch line 68b to generate low-temperature and low-pressure air LLA. A discharge port of the expansion turbine 65 is connected to one end of the low-temperature and low-pressure air main line 69m. The other end of the low-temperature and low-pressure air main line 69m is connected to a low-temperature and low-pressure air inlet of the quaternary cooler 67. Therefore, the quaternary cooler (the first cooling heat exchanger) 67 can perform heat exchange between the highly compressed air HCA that has passed through the tertiary cooler 66 and the low-temperature and low-pressure air LLA from the expansion turbine 65 to cool the highly compressed air HCA. Part of the highly compressed air HCA cooled by the quaternary cooler (the first cooling heat exchanger) 67 becomes the liquid air LA, and the rest remains as the cooled highly compressed air HCA. On the other hand, the low-temperature and low-pressure air LLA heated by heat exchange with the highly compressed air HCA is discharged from the quaternary cooler 67 to the atmosphere. The low-temperature and low-pressure air branch line 69b is a line branched from the low-temperature and low-pressure air main line 69m. The low-temperature and low-pressure air branch line 69b is connected to the gas-liquid separation tank 77. A gas-liquid mixing outlet of the quaternary cooler 67 and the gas-liquid separation tank 77 are connected by the gas-liquid mixing line 74. The cooled highly compressed air HCA from the quaternary cooler (the first cooling heat exchanger) and the liquid air LA flow into the gas-liquid mixing line 74. The gas-liquid mixing line 74 is provided with the expansion valve 75. The expansion valve 75 adiabatically expands a fluid flowing through the gas-liquid mixing line 74 and promotes liquefaction of the fluid.

The primary cooler (the second cooling heat exchanger) 61 is provided at a position between the bleed air amount regulating valve 52 and the boost compressor 64 in the bleed air line 51. The primary cooler (the second cooling heat exchanger) 61 can perform heat exchange between the compressed air CA flowing through the bleed air line 51 and a heat storage material HG to heat the heat storage material HG and cool the compressed air CA. The secondary cooler 62 is provided at a position between the primary cooler 61 and the boost compressor 64 in the bleed air line 51. The secondary cooler 62 can cool the compressed air CA by performing heat exchange between the compressed air CA from the primary cooler 61 and a cooling medium such as seawater, river water, or underground water.

The highly compressed air HCA from the quaternary cooler (the first cooling heat exchanger) 67 and the liquid air LA can flow into the gas-liquid separation tank 77 through the gas-liquid mixing line 74. In the gas-liquid separation tank 77, the liquid air LA and the gaseous air are separated. The gaseous air is discharged to the atmosphere through the low-temperature and low-pressure air branch line 69b and the quaternary cooler 67.

The liquid air supply line 78 connects the gas-liquid separation tank 77 and the liquid air tank 53. The liquid air supply regulating valve 79 can regulate the flow rate of the liquid air LA flowing through the liquid air supply line 78.

The heating system 80 includes a first heating device 81 that can heat the liquid air LA from the liquid air tank 53 to generate vaporized air VA obtained by vaporization of the liquid air LA, a second heating device 88 that can heat the vaporized air VA from the first heating device 81, and a third heating device 95 that can heat the vaporized air VA from the second heating device 88. In the following, the liquid air LA and the vaporized air VA will be collectively referred to as return air RA.

The first heating device 81 includes a gas-liquid tank 82 capable of storing the liquid air LA and the vaporized air VA obtained by vaporization of the liquid air LA, a primary heater (a first heating heat exchanger) 67, a heating liquid air line 83, a heating liquid air pump 84, a heating liquid air regulating valve 85, and a vaporized air return line 86.

The heating liquid air line 83 connects a liquid air outlet of the gas-liquid tank 82 and a liquid air inlet of the primary heater 67. The heating liquid air line 83 is provided with the heating liquid air pump 84 and the heating liquid air regulating valve 85. The vaporized air return line 86 connects a vaporized air outlet of the primary heater 67 and a vaporized air inlet of the gas-liquid tank 82.

The primary heater (the first heating heat exchanger) 67 is a heat exchanger that performs heat exchange between the compressed air CA and the liquid air LA, and is also the quaternary cooler (the first cooling heat exchanger) 67 described above. Therefore, the primary heater (the first heating heat exchanger) 67 can perform heat exchange between the liquid air LA from the gas-liquid tank 82 and the low-temperature and low-pressure air LLA from the low-temperature and low-pressure air main line 69m, and the highly compressed air HCA from the highly compressed air main line 68m. The primary heater (the first heating heat exchanger) 67, the heating liquid air line 83, the heating liquid air pump 84, the heating liquid air regulating valve 85, and the vaporized air return line 86 of the first heating device 81 also configure a part of the cooling device 63 in the liquefaction system 60.

The second heating device 88 includes a heat storage tank 89 capable of storing the heat storage material HG having fluidity, a secondary heater (a second heating heat exchanger) 91, a heat storage material supply line 92, a heat storage material feeder 92p, a high-temperature heat storage material line 93, a heat storage material regulating valve 93v, and a low-temperature heat storage material line 94.

The heat storage material supply line 92 connects a heat storage material outlet of the heat storage tank 89 and a heat storage material inlet of the secondary heater 91. The heat storage material feeder 92p is provided in the heat storage material supply line 92. The heat storage material feeder 92p is a blower in a case where the heat storage material HG flowing through the heat storage material supply line 92 is a gas, and is a pump in a case where the heat storage material HG flowing through the heat storage material supply line 92 is a liquid.

The secondary heater (the second heating heat exchanger) 91 can perform heat exchange between the heat storage material HG from the heat storage tank 89 and the vaporized air VA to heat the vaporized air VA and cool the heat storage material HG.

The high-temperature heat storage material line 93 connects a heat storage material outlet of the secondary heater 91 and a heat storage material inlet of the primary cooler (the second cooling heat exchanger) 61. Therefore, the primary cooler (the second cooling heat exchanger) 61 can perform heat exchange between the heat storage material HG cooled by the secondary heater (the second heating heat exchanger) 91 and the compressed air CA to cool the compressed air CA and heat the heat storage material HG. The high-temperature heat storage material line 93 is provided with the heat storage material regulating valve 93v that can regulate the flow rate of the heat storage material HG flowing through the high-temperature heat storage material line 93 and the heat storage material supply line 92. The low-temperature heat storage material line 94 connects a heat storage material outlet of the primary cooler (the second cooling heat exchanger) 61 and a heat storage material inlet of the heat storage tank 89. Therefore, the heat storage material HG heated by the primary cooler (the second cooling heat exchanger) 61 flows into the heat storage tank 89.

The third heating device 95 includes a tertiary heater (a third heating heat exchanger) 96, a branch steam line 97, and a branch steam regulating valve 97v.

The branch steam line 97 is a line branched from the main steam line 44 of the exhaust heat utilization facility 40. The branch steam line 97 is connected to a steam inlet of the tertiary heater 96. The branch steam line 97 is provided with the branch steam regulating valve 97v. The tertiary heater (the third heating heat exchanger) 96 can perform heat exchange between the vaporized air VA heated by the second heating device 88 and the steam to heat the vaporized air VA and cool the steam. The steam cooled by heat exchange with the vaporized air VA in the tertiary heater 96 is returned to the condenser 45, for example.

The return air line 54 includes a liquid air line 55 and a vaporized air line 58. The liquid air line 55 connects a liquid air outlet of the liquid air tank 53 and a liquid air inlet of the gas-liquid tank 82. The liquid air line 55 is provided with the liquid air pump 56 and the return amount regulating valve 57. The return amount regulating valve 57 can regulate the flow rate of the return air RA flowing through the return air line 54. The vaporized air line 58 connects a vaporized air outlet of the gas-liquid tank 82 and the intermediate casing 4 that forms a flow path through which the compressed air CA from the compressor 10 flows. The secondary heater (the second heating heat exchanger) 91 is provided in the vaporized air line 58. The tertiary heater (the third heating heat exchanger) 96 is provided between the secondary heater (the second heating heat exchanger) 91 and the intermediate casing 4 in the vaporized air line 58.

The control device 100 includes a fuel controller 101, an IGV controller 102, and a liquefaction controller 103.

A power value measured by the GT wattmeter 39m and a power value measured by the ST wattmeter 49m are input to the fuel controller 101. The power value measured by the GT wattmeter 39m is an actual output value of the gas turbine 1. The power value measured by the ST wattmeter 49m is an actual output value of the steam turbine 43. Therefore, the power value obtained by adding the power value measured by the GT wattmeter 39m and the power value measured by the ST wattmeter 49m is an actual output value of the gas turbine plant. A load command LC is also input to the fuel controller 101 from the outside. The load command LC indicates a required output value of the gas turbine plant. The fuel controller 101 determines a fuel flow rate to be supplied to the combustor 17 according to a deviation between the power value obtained by adding the power value measured by the GT wattmeter 39m and the power value measured by the ST wattmeter 49m, that is, the actual output value of the gas turbine plant, and the required output value of the gas turbine plant indicated by the load command LC, or the like. The fuel controller 101 further determines a valve opening degree of the fuel regulating valve 6 according to the fuel flow rate, and sends this valve opening degree to the fuel regulating valve 6.

Figure 2:
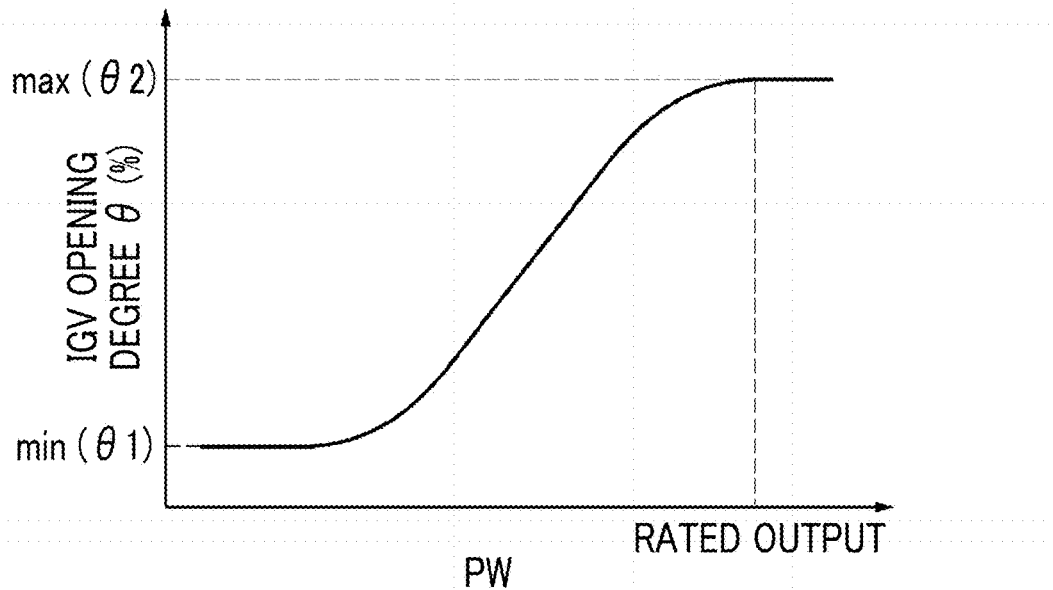
FIG. 2 is a graph showing a relationship between an IGV opening degree and a gas turbine output in the first embodiment of the present disclosure.

The IGV controller 102 has a function indicating the relationship between the fuel flow rate determined by the fuel controller 101 or the gas turbine output according to the fuel flow rate and an IGV opening degree θ, as shown in FIG. 2. This function is a function in which the IGV opening degree θ increases as the fuel f flow rate determined by the fuel controller 101 or the gas turbine output according to the fuel flow rate increases. The IGV opening degree θ is the opening degree of the plurality of guide vanes 15v. When the IGV opening degree θ, that is, the opening degree of the plurality of guide vanes 15v, increases, the intake air amount of the compressor 10 increases. The IGV controller 102 uses this function to determine the IGV opening degree θ according to the fuel flow rate or the gas turbine output determined by the fuel controller 101. Then, the IGV controller 102 sends the IGV opening degree θ to the driver 15d of the IGV 15.

The liquefaction controller 103 controls the operation of the liquefaction facility 50 according to the IGV opening degree θ or the load command LC. The operation of the liquefaction controller 103 and the operation of the liquefaction facility 50 based on this operation will be described in detail later. As described above, the load command LC is a type of parameter having a correlation with the IGV opening degree θ.

The control device 100 described above is a computer. Therefore, the control device 100 includes, in terms of hardware, a central processing unit (CPU) that performs various calculations, a main storage device such as a memory that serves as a a work area for the CPU, an auxiliary storage device such as a hard disk drive device, an input device such as a keyboard or a mouse, and a display device. Each of the functional units in the control device 100, such as the fuel controller 101, the IGV controller 102, and the liquefaction controller 103, functions when the CPU executes a control program stored in the auxiliary storage device, for example.

Next, the operation of the gas turbine plant described above will be described.

The compressor 10 of the gas turbine 1 compresses the air A to generate the compressed air CA. The compressed air CA from the compressor 10 passes through the intermediate casing 4 and flows into the combustor 17. Fuel also flows into the combustor 17. In the combustion tube 17c of the combustor 17, the fuel is burned in the compressed air CA to generate a high-temperature and high-pressure combustion gas. The combustion gas is sent from the combustor 17 to a combustion gas passage in the turbine 20 to rotate the turbine rotor 21. With the rotation of the turbine rotor 21, the GT generator 38 connected to the gas turbine rotor 2 generates electricity.

As described above, all of the combustion tube 17c of the combustor 17 and the plurality of rotor blades 21b and the plurality of stator blades 22v of the turbine 20 are high-temperature parts with which the combustion gas comes into contact. In order to increase the durability of these high-temperature parts, in the present embodiment, cooling air is supplied to these high-temperature parts to cool them. Specifically, in the present embodiment, the compressed air CA is bled from the intermediate casing 4 through which the compressed air CA from the compressor 10 flows, and the compressed air CA is cooled by the cooler 32 to become cooling air. Then, the cooling air is sent to each of the high-temperature parts.

The combustion gas that has rotated the turbine rotor 21 is exhausted from the turbine 20 as an exhaust gas, and is discharged to the atmosphere from the chimney 42 through the duct 41d of the exhaust heat recovery boiler 41. In the duct 41d of the exhaust heat recovery boiler 41, in the process in which the exhaust gas passes through the duct 41d, heat exchange between the water or steam in the heat transfer tube 41t disposed in the duct 41d and the exhaust gas is performed, so that high-temperature and high-pressure steam is produced.

This steam is sent to the steam turbine 43 through the main steam line 44. The steam turbine 43 is driven by this steam. By the driving of the steam turbine 43, the ST generator 48 connected to the steam turbine 43 generates electricity. The steam exhausted from the steam turbine 43 is returned to water in the condenser 45. The water in the condenser 45 is returned to the heat transfer tube 41t of the exhaust heat recovery boiler 41 through the water supply line 46.

As described above, the fuel controller 101 of the control device 100 determines the fuel flow rate to be supplied to the combustor 17 according to a deviation between the required output value of the gas turbine plant, which is indicated by the load command LC, and the actual output value of the gas turbine plant, or the like. Therefore, when the required output value of the gas turbine plant, which is indicated by the load command LC, increases, the fuel flow rate that is supplied to the combustor 17 increases, and when the required output value of the gas turbine plant, which is indicated by the load command LC, decreases, the fuel flow rate that is supplied to the combustor 17 decreases. Further, the IGV controller 102 uses the function shown in FIG. 2 to determine the IGV opening degree θ according to the fuel flow rate or the gas turbine output. Therefore, when the fuel flow rate increases and the gas turbine output increases, the IGV opening degree θ increases, and when the fuel flow rate decreases and the gas turbine output decreases, the IGV opening degree θ decreases.

As shown in FIG. 2, the IGV opening degree θ has a minimum opening degree min and a maximum opening degree max. When the gas turbine output is the rated output, the IGV opening degree θ is the maximum opening degree max. Further, when the gas turbine output is the minimum output, the IGV opening degree θ is the minimum opening degree min. Here, the minimum opening degree min is defined as a first opening degree θ1, and the maximum opening degree max is defined as a second opening degree θ2. Therefore, the first opening degree θ1 is an opening degree when the amount of intake air flowing into the compressor casing 14 is made smaller than the amount of intake air when the gas turbine output is the rated output.

Figure 3:
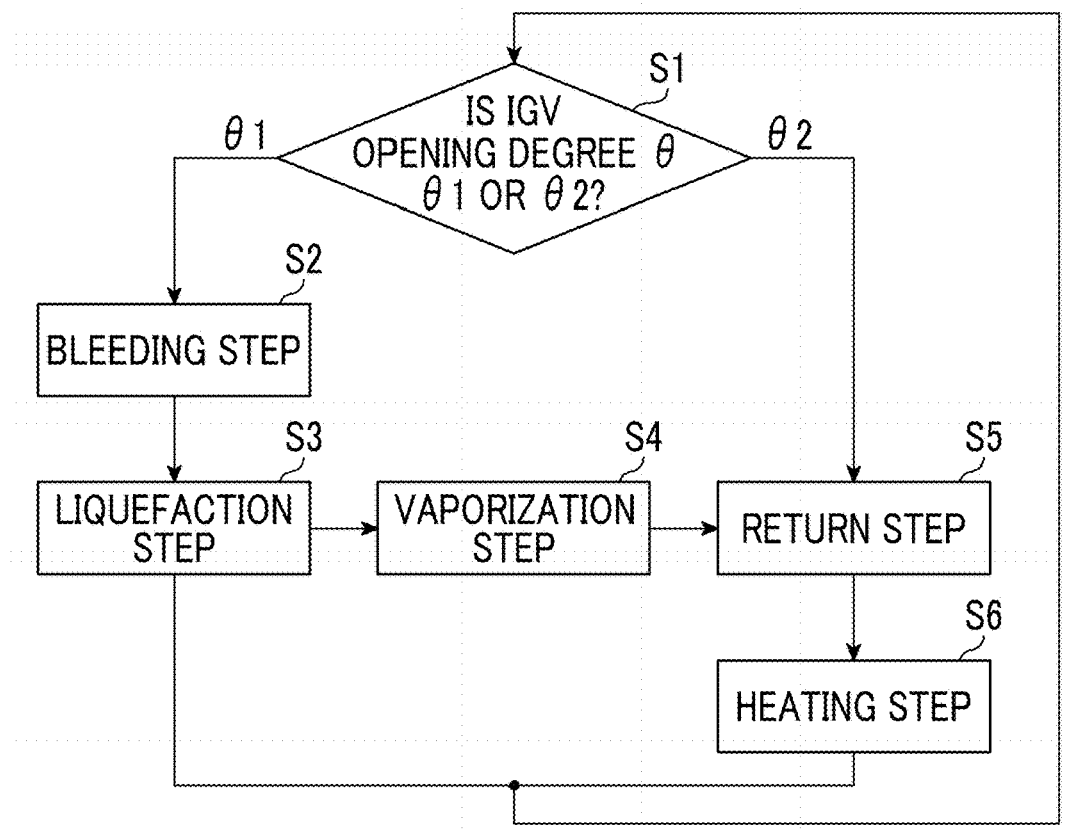
FIG. 3 is a flowchart showing an operation of a liquefaction controller in the first embodiment of the present disclosure.

As shown in FIG. 3, the liquefaction controller 103 monitors whether the IGV opening degree θ is the first opening degree θ1 or the second opening degree θ2 (an opening degree monitoring step S1). The liquefaction controller 103 determines whether the IGV opening degree θ is the first opening degree θ1 or the second opening degree θ2, from any one of the IGV opening degree θ that is indicated by a control signal sent from the IGV controller 102 to the IGV 15, the fuel flow rate determined by the fuel controller 101, and the power value from the GT wattmeter 39m.

When the liquefaction controller 103 determines that the IGV opening degree θ is the first opening degree θ1 (the minimum opening degree min) in the opening degree monitoring step S1, the liquefaction controller 103 outputs an opening instruction to the bleed air amount regulating valve 52. As a result, the bleed air amount regulating valve 52 is opened, and a bleeding step S2 is executed. In the bleeding step S2, the compressed air CA in the intermediate casing 4 flows into the liquefaction system 60 through the bleed air line 51.

When the liquefaction controller 103 further determines that the IGV opening degree θ is the first opening degree θ1 (the minimum opening degree min), the liquefaction controller 103 drives the liquefaction system 60. As a result, a liquefaction step S3 and a vaporization step S4 are executed. In the liquefaction step S3, first, in the primary cooler (the second cooling heat exchanger) 61, heat exchange between the compressed air CA flowing through the bleed air line 51 and the heat storage material HG is performed to heat the heat storage material HG and cool the compressed air CA. The heated heat storage material HG flows into the heat storage tank 89. On the other hand, the cooled compressed air CA is heat-exchanged with a cooling medium such as seawater, river water, or underground water in the secondary cooler 62, and the compressed air CA is further cooled.

The compressed air CA cooled by the secondary cooler 62 becomes the highly compressed air HCA compressed by the boost compressor 64. The highly compressed air HCA is cooled by heat exchange with a cooling medium such as seawater, river water, or underground water in the tertiary cooler 66. Part of the highly compressed air HCA cooled by the tertiary cooler 66 flows into the expansion turbine 65 through the highly compressed air branch line 68b. The highly compressed air HCA is adiabatically expanded in the expansion turbine 65 and becomes the low-temperature and low-pressure air LLA.

The low-temperature and low-pressure air LLA flows into the quaternary cooler 67 through the low-temperature and low-pressure air main line 69m. Further, in the liquefaction step S3, the heating liquid air pump 84 of the first heating device 81 is driven, and the heating liquid air regulating valve 85 of the first heating device 81 is opened. Therefore, the liquid air LA in the gas-liquid tank 82 of the first heating device 81 flows into the quaternary cooler 67. As a result, in the quaternary cooler (the first cooling heat exchanger) 67, heat exchange between the liquid air LA from the gas-liquid tank 82 and the low-temperature and low-pressure air LLA from the low-temperature and low-pressure air main line 69m, and the other part of the highly compressed air HCA is performed, so that the other part of the highly compressed air HCA is cooled to at least partially become the liquid air LA. The liquid air LA flows into the gas-liquid mixing line 74 together with the highly compressed air HCA that has not been liquefied in the quaternary cooler 67. The fluid that has flowed into the gas-liquid mixing line 74 is adiabatically expanded by the expansion valve 75 provided in the gas-liquid mixing line 74, and liquefaction is promoted. The liquid air LA from the gas-liquid tank 82 is heated and vaporized by heat exchange with the highly compressed air HCA in the quaternary cooler (the primary heater, the first heating heat exchanger) 67, and returns to the gas-liquid tank 82. Therefore, in the liquefaction step S3, the liquid air LA in the gas-liquid tank 82 gradually decreases, and the vaporized air VA in the gas-liquid tank 82 gradually increases. That is, in the liquefaction step S3, the vaporization step S4 in which the liquid air LA is vaporized to generate the vaporized air VA is also executed. Further, the low-temperature and low-pressure air LLA from the expansion turbine 65 is heated by heat exchange with the highly compressed air HCA in the quaternary cooler 67, and then is discharged to the atmosphere.

The fluid whose liquefaction has been promoted by the expansion valve 75 flows into the gas-liquid separation tank 77 and is separated into gaseous air and the liquid air LA. The liquid air LA in the gas-liquid separation tank 77 flows into the liquid air tank 53 through the liquid air supply line 78.

When the IGV opening degree θ is the first opening degree θ1 (the minimum opening degree min), the bleeding step S2, the liquefaction step S3, and the vaporization step S4 described above are continuously executed.

As described above, when the IGV opening degree θ is the first opening degree θ1 (the minimum opening degree min), the compressed air CA in the intermediate casing 4 is bled, so that the flow rate of the compressed air CA flowing into the combustor 17 from the inside of the intermediate casing 4 decreases. As a result, the flow rate of the combustion gas generated in the combustor 17 becomes smaller than in a case where the compressed air CA in the intermediate casing 4 is not bled, and the gas turbine output decreases.

When the liquefaction controller 103 determines that the IGV opening degree θ is not the first opening degree θ1 (the minimum opening degree min) in the opening degree monitoring step S1, the liquefaction controller 103 closes the bleed air amount regulating valve 52 to stop the bleeding step S2, and stops the liquefaction system 60 to stop the liquefaction step S3.

When the liquefaction controller 103 determines that the IGV opening degree θ is the second opening degree θ2 (the maximum opening degree max) in the opening degree monitoring step S1, the liquefaction controller 103 outputs an opening instruction to the return amount regulating valve 57, and outputs a drive instruction to the liquid air pump 56 and the heating system 80. As a result, the return amount regulating valve 57 is opened, the liquid air pump 56 and the heating system 80 are driven, and a return step S5 and a heating step S6 are executed.

In the return step S5, the liquid air LA in the liquid air tank 53 flows into the gas-liquid tank 82 through the liquid air line 55 in the return air line 54. As a result, the amount of liquid air LA in the gas-liquid tank 82 increases, and the vaporized air VA in the gas-liquid tank 82 is pushed out by the liquid air LA. The vaporized air VA flows into the intermediate casing 4 through the secondary heater 91, the tertiary heater 96, and the vaporized air line 58 in the return air line 54. In the heating step S6, the vaporized air VA is heated by the secondary heater 91 and the tertiary heater 96 provided in the vaporized air line 58. The vaporized air VA from the gas-liquid tank 82 and the heat storage material HG from the heat storage tank 89 heated in the liquefaction step S3 flow into the secondary heater 91. As a result, in the secondary heater (the second heating heat exchanger) 91, heat exchange between the heated heat storage material HG and the vaporized air VA is performed, so that the heat storage material HG is cooled and the vaporized air VA is heated. The cooled heat storage material HG passes through the primary cooler (the second cooling heat exchanger) 61 and then returns to the heat storage tank 89. On the other hand, the vaporized air VA heated by heat exchange with the heat storage material HG flows into the tertiary heater 96 through the vaporized air line 58. The steam from the exhaust heat recovery boiler 41 also flows into the tertiary heater 96. As a result, in the tertiary heater (the third heating heat exchanger) 96, heat exchange between the heated vaporized air VA and the steam is performed, so that the heated vaporized air VA is further heated and the steam is cooled. The cooled steam is returned to the condenser 45, for example. On the other hand, the further heated vaporized air VA flows into the intermediate casing 4 through the vaporized air line 58, as described above.

When the IGV opening degree θ is the second opening degree θ2 (the maximum opening degree max), the return step S5 and the heating step S6 described above are continuously executed in parallel.

As described above, when the IGV opening degree θ is the second opening degree θ2 (the maximum opening degree max), the heated vaporized air VA flows into the intermediate casing 4, so that the flow rate of the compressed air CA (including the heated vaporized air VA) that flows into the combustor 17 from the inside of this intermediate casing 4 increases.

As a result, the flow rate of the combustion gas that is generated in the combustor 17 becomes larger than in a case where the vaporized air VA in the intermediate casing 4 is not allowed to flow in, and the gas turbine output increases.

As described above, in the present embodiment, when the IGV opening degree θ is the first opening degree θ1 (the minimum opening degree min), the compressed air CA in the intermediate casing 4 is bled to decrease the gas turbine output, and when the IGV opening degree θ is the second opening degree θ2 (the maximum opening degree max), the high-temperature vaporized air VA in the intermediate casing 4 is allowed to flow in to increase the gas turbine output. Therefore, in the present embodiment, it is possible to flexibly perform gas turbine output adjustment and to flexibly cope with load fluctuations in the electric power system.

In the present embodiment, in the liquefaction step S3, the compressed air CA is cooled by using low-temperature thermal energy that is obtained in the vaporization step S4 or the heating step S6. Further, in the present embodiment, in the vaporization step S4 or the heating step S6, the liquid air LA or the vaporized air VA is heated by using high-temperature thermal energy that is obtained in the liquefaction step S3. Therefore, in the present embodiment, it is possible to reduce the thermal energy that is supplied from outside the liquefaction facility 50.

In the opening degree monitoring step S1 in the embodiment described above, the liquefaction controller 103 monitors the IGV opening degree θ. As described above, a change in the IGV opening degree θ has a correlation with a change in the load command LC. Therefore, in the opening degree monitoring step S1, the load command LC from the outside may be monitored instead of the IGV opening degree θ. As described above, when the gas turbine output is the rated output, the IGV opening degree θ is the maximum opening degree max (the second opening degree θ2), and when the gas turbine output is the minimum output, the IGV opening degree θ is the minimum opening degree min (the first opening degree θ1). Therefore, in a case of monitoring the load command LC in the opening degree monitoring step S1, it is necessary to monitor whether an output value that is indicated by the load command LC is an output value (a second output value) that should make the gas turbine output the rated output, or whether an output value that is indicated by the load command LC is an output value (a first output value) that should make the gas turbine output the minimum output. The first output value corresponds to the first opening degree θ1, and the second output corresponds to the second opening degree θ2.

Second Embodiment

Next, a second embodiment of the gas turbine plant according to the present disclosure will be described using FIGS. 4 and 5.

Figure 4:
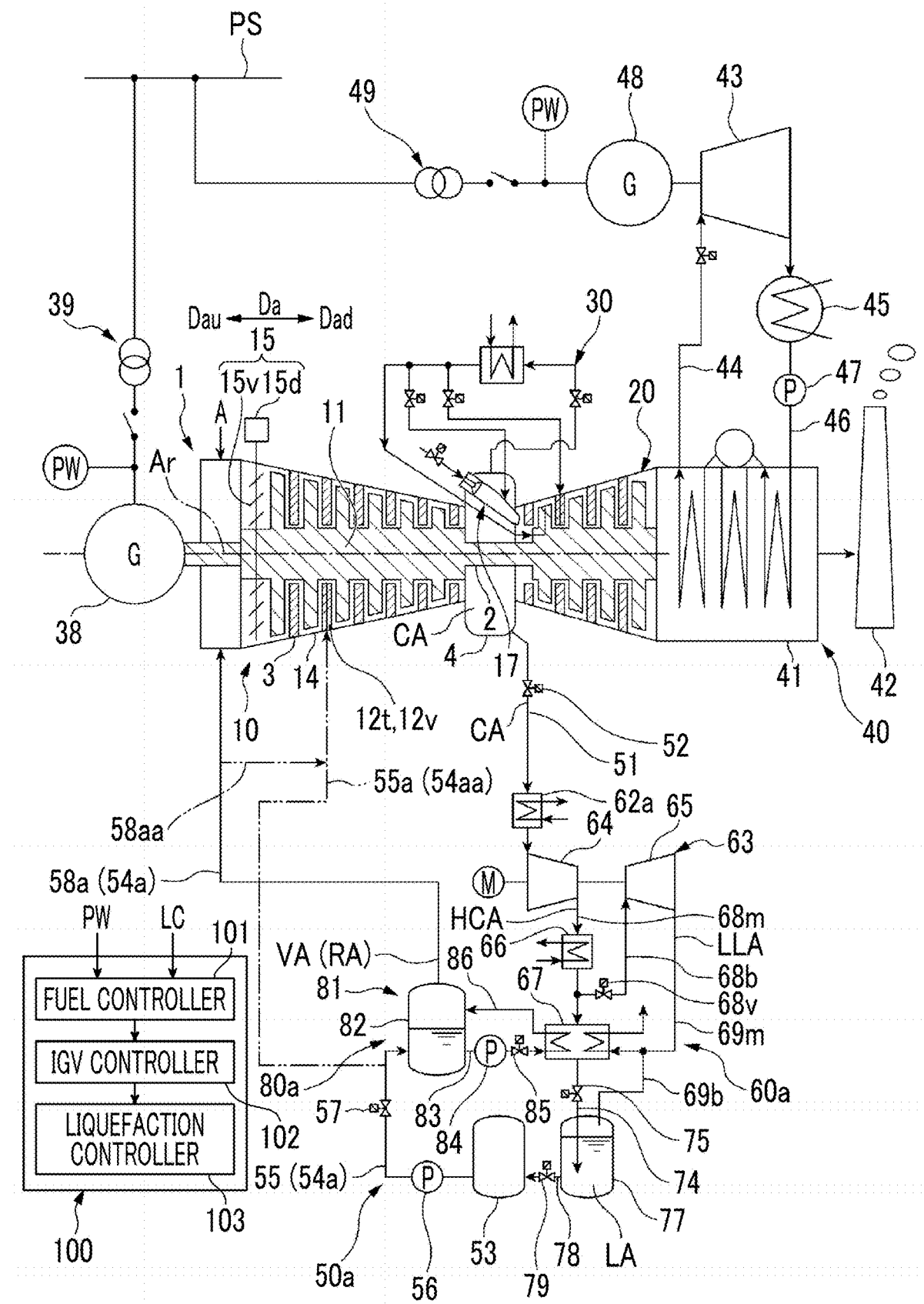
FIG. 4 is a system diagram of a gas turbine plant in a second embodiment of the present disclosure.
Figure 5:
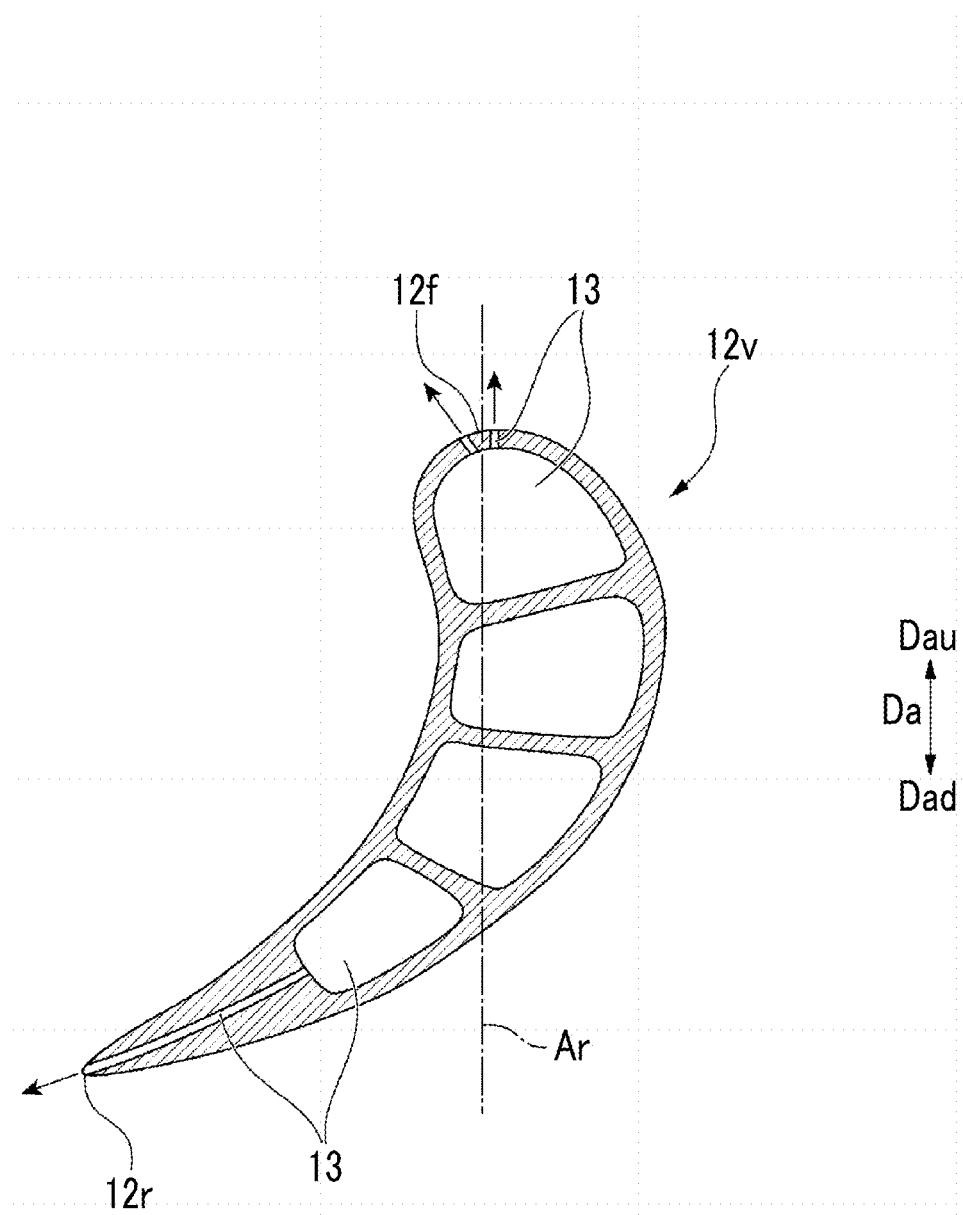
FIG. 5 is a sectional view of a stator blade of a compressor in the second embodiment of the present disclosure.

As shown in FIG. 4, a gas turbine plant of the present embodiment includes the gas turbine 1, the GT generator 38, the GT power supply facility 39, the turbine cooling device 30, the exhaust heat utilization facility 40, a liquefaction facility 50a, and the control device 100, as with the gas turbine plant of the first embodiment. However, the liquefaction facility 50a of the present embodiment is different from the liquefaction facility 50 of the first embodiment.

The liquefaction facility 50a of the present embodiment includes the bleed air line 51, the bleed air amount regulating valve 52, a liquefaction system 60a, the liquid air tank 53, a heating system 80a, a return air line 54a, the liquid air pump 56, and the return amount regulating valve 57, as with the gas liquefaction facility 50 of the first embodiment. However, in the present embodiment, the return destination of the return air RA by the return air line 54a is different from that in the first embodiment. Therefore, the heating system 80a of the present embodiment is different from the heating system 80 of the first embodiment. Further, the liquefaction system 60a of the present embodiment is different from the liquefaction system 60 of the first embodiment.

The return air line 54a of the present embodiment has the liquid air line 55 and a vaporized air line 58a, as with the return air line 54 of the first embodiment. The connection destination of the vaporized air line 58a is the compressor casing 14, unlike the connection destination of the vaporized air line 58 of the first embodiment. That is, in the present embodiment, the return air RA is returned into an air flow path through which air flows in the compressor 10. Specifically, the connection destination of the vaporized air line 58a of the present embodiment is a position on the axis line upstream side Dau with respect to the position where the plurality of guide vanes 15v of the IGV 15 are disposed, in the compressor casing 14. That is, in the present embodiment, the return air RA is returned to a flow path portion through which air before the intake air amount thereof is regulated by the IGV 15 flows, in an air flow path of the compressor 10. The temperature of the air flowing through the air flow path of the compressor 10 is lower than the temperature of the compressed air CA flowing into the combustor 17. Therefore, the temperature of the return air RA in the present embodiment may be lower than the temperature of the return air RA in the first embodiment. Therefore, the heating system 80a of the present embodiment is different from the heating system 80 of the first embodiment, as described above.

The heating system 80a of the present embodiment includes the first heating device 81 that can heat the liquid air LA from the liquid air tank 53 to generate the vaporized air VA. However, the heating system 80a of the present embodiment does not include the second heating device 88 and the third heating device 95 in the heating system 80 of the first embodiment. Therefore, the vaporized air line 58a of the present embodiment is not provided with the secondary heater 91 and the tertiary heater 96 in the first embodiment.

The heating system 80a of the present embodiment does not include the second heating device 88 and the third heating device 95 in the first embodiment, so that the liquefaction system 60a of the present embodiment is different from the liquefaction system 60 of the first embodiment. The liquefaction system 60a of the present embodiment includes a primary cooler 62a similar to the secondary cooler 62 of the first embodiment, the cooling device 63, the gas-liquid separation tank 77, the liquid air supply line 78, and the liquid air supply regulating valve 79. The cooling device 63 includes the boost compressor 64, the expansion turbine 65, the tertiary cooler 66, the quaternary cooler (the first cooling heat exchanger) 67, the highly compressed air main line 68m, a high-pressure air branch line, the low-temperature and low-pressure air main line 69m, the low-temperature and low-pressure air branch line 69b, the gas-liquid mixing line 74, the highly compressed air regulating valve 68v, and the expansion valve 75, as with the cooling device 63 of the first embodiment. The primary heater (the first heating heat exchanger) 67, the heating liquid air line 83, the vaporized air return line 86, the heating liquid air pump 84, and the heating liquid air regulating valve 85 of the first heating device 81 of the present embodiment also configure a part of the cooling device 63, as with the first embodiment.

The liquefaction controller 103 of the control device 100 monitors whether the IGV opening degree θ is the first opening degree θ1 or the second opening degree θ2, as with the first embodiment.

When the liquefaction controller 103 determines that the IGV opening degree θ is the first opening degree θ1, the liquefaction controller 103 outputs an opening instruction to the bleed air amount regulating valve 52, as with the first embodiment. As a result, the bleed air amount regulating valve 52 is opened, and the bleeding step S2 is executed. In the bleeding step S2, the compressed air CA in the intermediate casing 4 flows into the liquefaction system 60a through the bleed air line 51.

When the liquefaction controller 103 further determines that the IGV opening degree θ is the first opening degree θ1, the liquefaction controller 103 drives the liquefaction system 60a. As a result, as with the first embodiment, the liquefaction step S3 is executed. In the liquefaction step S3, first, the compressed air CA is cooled by heat exchange with a cooling medium such as seawater in the primary cooler 62a.

The compressed air CA cooled by the primary cooler 62a becomes the highly compressed air HCA compressed by the boost compressor 64. The highly compressed air HCA is cooled by heat exchange with a cooling medium such as seawater in the tertiary cooler 66. Part of the highly compressed air HCA cooled by the tertiary cooler 66 flows into the expansion turbine 65 through the highly compressed air branch line 68b. The highly compressed air HCA is adiabatically expanded in the expansion turbine 65 and becomes the low-temperature and low-pressure air LLA. The low-temperature and low-pressure air LLA flows into the quaternary cooler 67 through the low-temperature and low-pressure air main line 69m. Further, in the liquefaction step S3, the heating liquid air pump 84 of the first heating device 81 is driven, and the heating liquid air regulating valve 85 of the first heating device 81 is opened. As a result, the liquid air LA in the gas-liquid tank 82 of the first heating device 81 flows into the quaternary cooler 67. Therefore, in the quaternary cooler (the first cooling heat exchanger) 67, heat exchange between the liquid air LA from the gas-liquid tank 82 and the low-temperature and low-pressure air LLA from the low-temperature and low-pressure air main line 69m, and the other part of the highly compressed air HCA is performed, and the other part of the highly compressed air HCA is cooled and at least partially becomes the liquid air LA. The liquid air LA flows into the gas-liquid mixing line 74 together with the highly compressed air HCA that has not been liquefied in the quaternary cooler 67. The fluid that has flowed into the gas-liquid mixing line 74 is adiabatically expanded by the expansion valve 75 provided in the gas-liquid mixing line 74, and liquefaction is promoted. The liquid air LA from the gas-liquid tank 82 is heated and vaporized by heat exchange with the highly compressed air HCA in the quaternary cooler (the primary heater, the first heating heat exchanger) 67, and returns to the gas-liquid tank 82. Therefore, in the liquefaction step S3, the liquid air LA in the gas-liquid tank 82 gradually decreases, and the vaporized air VA in the gas-liquid tank 82 gradually increases. That is, in the liquefaction step S3, the vaporization step S4 in which the liquid air LA is vaporized to generate the vaporized air VA is also executed. Further, the low-temperature and low-pressure air LLA from the expansion turbine 65 is heated by heat exchange with the highly compressed air HCA in the quaternary cooler 67, and then is discharged to the atmosphere.

The fluid whose liquefaction has been promoted by the expansion valve 75 flows into the gas-liquid separation tank 77 and is separated into gaseous air and the liquid air LA. The liquid air LA in the gas-liquid separation tank 77 flows into the liquid air tank 53 through the liquid air supply line 78.

When the IGV opening degree θ is the first opening degree θ1, the bleeding step S2, the liquefaction step S3, and the vaporization step S4 are continuously executed.

As described above, when the IGV opening degree θ is the first opening degree θ1, as with the first embodiment, the compressed air CA in the intermediate casing 4 is bled, so that the flow rate of the compressed air CA flowing into the combustor 17 from the inside of the intermediate casing 4 decreases. As a result, the flow rate of the combustion gas generated in the combustor 17 becomes smaller than in a case where the compressed air CA in the intermediate casing 4 is not bled, and the gas turbine output decreases.

When the liquefaction controller 103 determines that the IGV opening degree θ is not the first opening degree θ1, the liquefaction controller 103 closes the bleed air amount regulating valve 52 to stop the bleeding step S2, the liquefaction system 60a to stop the and stops liquefaction step S3.

When the liquefaction controller 103 determines that the IGV opening degree θ is the second opening degree θ2, the liquefaction controller 103 outputs an opening instruction to the return amount regulating valve 57 and outputs a drive instruction to the liquid air pump 56. As a result, the return amount regulating valve 57 is opened, the liquid air pump 56 is driven, and the return step S5 is executed.

When the return amount regulating valve 57 is opened and the liquid air pump 56 is driven, the liquid air LA in the liquid air tank 53 flows into the gas-liquid tank 82 through the liquid air line 55 in the return air line 54a. As a result, the amount of liquid air LA in the gas-liquid tank 82 increases, and the vaporized air VA in the gas-liquid tank 82 is pushed out by the liquid air LA. The temperature of the vaporized air VA is lower than the temperature of the air that is sucked into the compressor 10. The vaporized air VA flows into an air flow path of the compressor 10 through the vaporized air line 58a in the return air line 54a. Therefore, the average temperature of the air flowing through the air flow path of the compressor 10 decreases. Even if the volume flow rate of the air flowing through the air flow path does not change, when the average temperature of the air flowing through the air flow path decreases, the mass flow rate of the air flowing through the air flow path increases.

In the present embodiment, the heating step S6 of heating the vaporized air VA in the first embodiment is not executed. However, a heater that heats the liquid air LA in the liquid air tank 53 to a temperature in a range of about 5° C. to 15° C. may be provided, and the heating step may be executed by using this heater.

As described above, when the IGV opening degree θ is the second opening degree θ2, the cold vaporized air VA flows into the air flow path of the compressor 10, and the mass flow rate of the air flowing through the air flow path increases. As a result, in the present embodiment, the mass flow rate of the combustion gas that is generated in the combustor 17 becomes larger than in a case where the cold vaporized air VA does not flow into the air flow path of the compressor 10, and the gas turbine output increases.

As described above, in the present embodiment, when the IGV opening degree θ is the first opening degree θ1, the compressed air CA in the intermediate casing 4 is bled to decrease the gas turbine output, and when the IGV opening degree θ is the second opening degree θ2, the cold vaporized air VA is allowed to flow into the air flow path of the compressor 10 to increase the gas turbine output. Therefore, in the present embodiment, it is possible to flexibly perform gas turbine output adjustment and to flexibly cope with load fluctuations in the electric power system.

Further, also in the present embodiment, in the liquefaction step S3, the compressed air CA is cooled by using the low-temperature thermal energy that is obtained in the vaporization step S4. Further, also in the present embodiment, in the vaporization step S4, the liquid air LA is vaporized by using the high-temperature thermal energy that is obtained in the liquefaction step S3. Therefore, also in the present embodiment, it is possible to reduce the thermal energy that is supplied from outside the liquefaction facility 50a.

In the example described above, the return air RA is led to a flow path portion through which air before the intake air amount thereof is regulated by the IGV 15 flows, of an air flow path in the compressor casing 14. That is, in the example described above, the return air RA is led to a flow path portion on the axis line upstream side Dau with respect to the plurality of guide vanes 15v of the IGV 15, of the air flow path in the compressor casing 14. However, the return air RA may be led to a flow path portion through which air after the intake air amount thereof is regulated by the IGV 15 flows, of the air flow path in the compressor casing 14. That is, the return air RA may be led to a flow path portion on the axis line downstream side Dad with respect to the plurality of guide vanes 15v of the IGV 15, of the air flow path in the compressor casing 14. In this case, as shown by a two-dot broken line in FIG. 4, a vaporized air line 58aa is connected to the plurality of stator blades 12v configuring any one of the plurality of stator blade rows 12t of the compressor 10. Further, as shown in FIG. 5, a plurality of air passages 13 passing through the stator blade 12v, communicating with the vaporized air line 58aa, and being open on the surface of the stator blade 12v are formed in each of the plurality of stator blades 12v to which the vaporized air line 58aa is connected. Any one of the plurality of air passages 13 is open in the vicinity of a front end 12f of the stator blade 12v in the surface of the stator blade 12v, and the other air passage 13 is open at a rear end 12r of the stator blade 12v in the surface of the stator blade 12v.

As described above, in a case where the return air RA is led to the stator blades 12v of the compressor 10, the return air RA may be the liquid air LA. In this case, as shown by the two-dot broken line in FIG. 4, the liquid air line 55a of the return air line 54aa is connected to the stator blade 12v of the compressor 10. In this case, the return air line 54aa does not require a vaporized air line.

Here, the return air RA is allowed to flow out into the air flow path of the compressor from the vicinity of the front end 12f and the rear end 12r of the stator blade 12v. However, the return air RA may be allowed to flow out into the air flow path of the compressor only from the rear end 12r of the stator blade 12v. In this manner, when the return air RA is allowed to flow out only from the rear end 12r of the stator blade 12v, turbulence of an air flow around the stator blade 12v can be suppressed. In particular, in a case where the liquid air LA is sent to the stator blade 12v as the return air RA, it is preferable that the return air RA is allowed to flow out only from the rear end 12r of the stator blade 12v.

Third Embodiment

Next, a third embodiment of the gas turbine plant according to the present disclosure will be described using FIG. 6.

Figure 6:
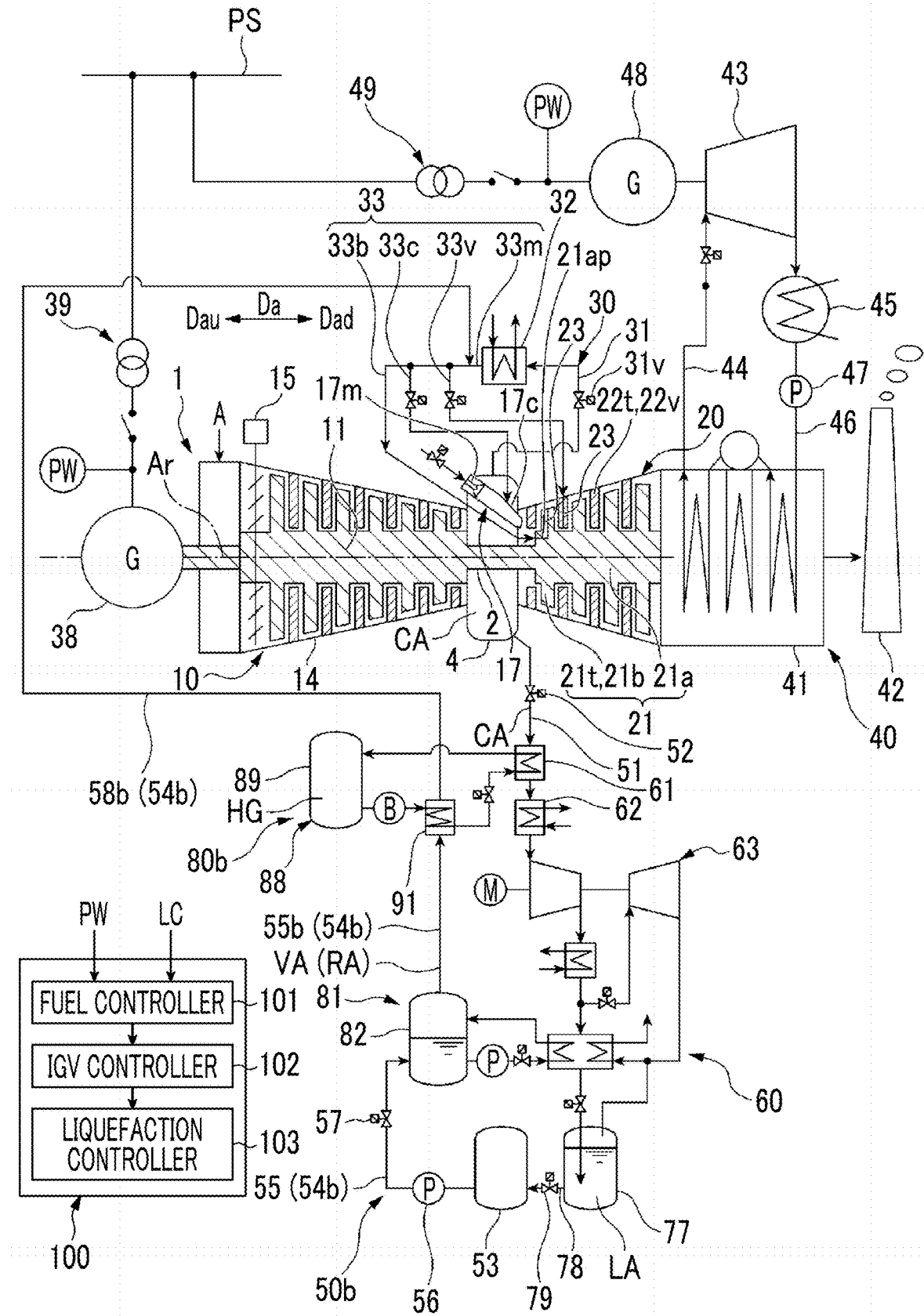
FIG. 6 is a system diagram of a gas turbine plant in a third embodiment of the present disclosure.

As shown in FIG. 6, the gas turbine plant of the present embodiment includes the gas turbine 1, the GT generator 38, the GT power supply facility 39, the turbine cooling device 30, the exhaust heat utilization facility 40, a liquefaction facility 50*b*, and the control device 100, as with the gas turbine plant of the first embodiment. However, the liquefaction facility 50*b* of the present embodiment is different from the liquefaction facility 50 of the first embodiment.

The liquefaction facility 50*b* of the present embodiment includes the bleed air line 51, the bleed air amount regulating valve 52, the liquefaction system 60, the liquid air tank 53, a heating system 80*b*, a return air line 54*b*, the liquid air pump 56, and the return amount regulating valve 57, as with the liquefaction facility 50 of the first embodiment. However, in the present embodiment, the return destination of the return air RA by the return air line 54*b* is different from that in the first embodiment. Therefore, the heating system 80*b* of the present embodiment is different from the heating system 80 of the first embodiment.

The return air line 54*b* of the present embodiment includes the liquid air line 55 and a vaporized air line 58*b*, as with the return air line 54 of the first embodiment. The connection destination of the vaporized air line 58*b* is different from the connection destination of the vaporized air line 58 of the first embodiment, and is the main cooling air line 33*m* of the turbine cooling device 30. In this case, all of the main cooling air line 33*m*, the combustor cooling air line 33*c*, the rotor blade cooling air line 33*b*, and the stator blade cooling air line 33*v* of the turbine cooling device 30 configure a part of the return air line 54*b*. Therefore, in the present embodiment, the return air RA is led to the high-temperature part of the gas turbine 1. In order to send the return air RA to the high-temperature part of the gas turbine 1, a compressor may be provided in the vaporized air line 58*b* to increase the pressure of the return air RA in the vaporized air line 58*b*, as necessary. In the first embodiment, the return air RA is led into the compressed air CA flowing into the combustor 17. However, in the present embodiment, the return air RA is led to the high-temperature part in order to cool the high-temperature part. Therefore, the temperature of the return air RA in the present embodiment may be lower than the temperature of the return air RA in the first embodiment. Therefore, the heating system 80*b* of the present embodiment is different from the heating system 80 of the first embodiment, as described above.

The heating system 80*b* of the present embodiment includes the first heating device 81 that can heat the liquid air LA from the liquid air tank 53 to generate the vaporized air VA, and the second heating device 88 that can heat the vaporized air VA. However, the heating system 80*b* of the present embodiment does not include the third heating device 95 of the heating system 80 of the first embodiment. Therefore, the vaporized air line 58*b* of the present embodiment is not provided with the tertiary heater 96 in the first embodiment.

The liquefaction system 60 of the present embodiment is the same as the liquefaction system 60 of the first embodiment. Therefore, the liquefaction system 60 of the present embodiment includes the primary cooler (the second cooling heat exchanger) 61, the secondary cooler 62, the cooling device 63, the gas-liquid separation tank 77, the liquid air supply line 78, and the liquid air supply regulating valve 79.

The liquefaction controller 103 of the control device 100 monitors whether the IGV opening degree θ is the first opening degree θ1 or the second opening degree θ2, as with the first embodiment.

When the liquefaction controller 103 determines that the IGV opening degree θ is the first opening degree θ1, the liquefaction controller 103 outputs an opening instruction to the bleed air amount regulating valve 52, as with the first embodiment. As a result, the bleed air amount regulating valve 52 is opened, and the bleeding step S2 is executed. In the bleeding step S2, the compressed air CA in the intermediate casing 4 flows into the liquefaction system 60 through the bleed air line 51. When the liquefaction controller 103 further determines that the IGV opening degree θ is the first opening degree θ1, the liquefaction controller 103 drives the liquefaction system 60. As a result, as with the first embodiment, the liquefaction step S3 and the vaporization step S4 are executed.

When the IGV opening degree θ is the first opening degree θ1, the bleeding step S2, the liquefaction step S3, and the vaporization step S4 described above are continuously executed.

As described above, when the IGV opening degree θ is the first opening degree θ1, as with the first embodiment, the compressed air CA in the intermediate casing 4 is bled, so that the flow rate of the compressed air CA flowing into the combustor 17 from the inside of the intermediate casing 4 decreases. As a result, the flow rate of the combustion gas generated in the combustor 17 becomes smaller than in a case where the compressed air CA in the intermediate casing 4 is not bled, and the gas turbine output decreases.

When the liquefaction controller 103 determines that the IGV opening degree θ is not the first opening degree θ1, the liquefaction controller 103 closes the bleed air amount regulating valve 52 to stop the bleeding step S2, and stops the liquefaction system 60 to stop the liquefaction step S3.

When the liquefaction controller 103 determines that the IGV opening degree θ is the second opening degree θ2, the liquefaction controller 103 outputs an opening instruction to the return amount regulating valve 57, and outputs a drive instruction to the liquid air pump 56 and the heating system 80*b*. As a result, the return amount regulating valve 57 is opened, the liquid air pump 56 and the heating system 80*b* are driven, and the return step S5 and the heating step S6 are executed.

In the return step S5, the liquid air LA in the liquid air tank 53 flows into the gas-liquid tank 82 through the liquid air line 55 in the return air line 54*b*. As a result, the amount of liquid air LA in the gas-liquid tank 82 increases, and the vaporized air VA in the gas-liquid tank 82 is pushed out by the liquid air LA. The vaporized air VA flows into the secondary heater 91 through the vaporized air line 58*b* in the return air line 54*b*. The heat storage material HG heated in the liquefaction step S3 further flows into the secondary heater 91 from the heat storage tank 89. As a result, in the secondary heater (the second heating heat exchanger) 91, heat exchange between the heated heat storage material HG and the vaporized air VA is performed to cool the heat storage material HG and heat the vaporized air VA (the heating step S6). The cooled heat storage material HG passes through the primary cooler (the second cooling heat exchanger) 61 and then returns to the heat storage tank 89. On the other hand, the vaporized air VA heated by heat exchange with the heat storage material HG flows into the high-temperature parts of the gas turbine 1 through the vaporized air line 58*b* of the return air line 54*b*.

When the IGV opening degree θ is the second opening degree θ2, the return step S5 and the heating step S6 described above are continuously executed.

As described above, in the present embodiment, when the IGV opening degree θ is the second opening degree θ2, the vaporized air VA from the liquefaction facility 50*b* flows into the high-temperature parts of the gas turbine 1, and therefore, at this time, the amount of the compressed air CA that is bled from the gas turbine 1 by the turbine cooling device 30 can be eliminated or reduced. As a result, the output of the turbine 20 for driving the compressor 10 is suppressed, and the gas turbine output increases.

As described above, in the present embodiment, when the IGV opening degree θ is the first opening degree θ1, the compressed air CA in the intermediate casing 4 is bled to decrease the gas turbine output, and when the IGV opening degree θ is the second opening degree. 02, the vaporized air VA is allowed to flow into the high-temperature parts to increase the gas turbine output. Therefore, in the present embodiment, it is possible to flexibly perform gas turbine output adjustment and to flexibly cope with load fluctuations in an electric power system.

In the present embodiment, as with the first embodiment, in the liquefaction step S3, the compressed air CA is cooled by using the low-temperature thermal energy that is obtained in the vaporization step S4 or the heating step S6. Further, in the present embodiment, as with the first embodiment, in the vaporization step S4 or the heating step S6, the liquid air LA or the vaporized air VA is heated by using the high-temperature thermal energy that is obtained in the liquefaction step S3. Therefore, also in the present embodiment, it is possible to reduce the thermal energy that is supplied from outside the liquefaction facility 50b.

Fourth Embodiment

Next, a fourth embodiment of the gas turbine plant according to the present disclosure will be described using FIG. 7.

Figure 7:
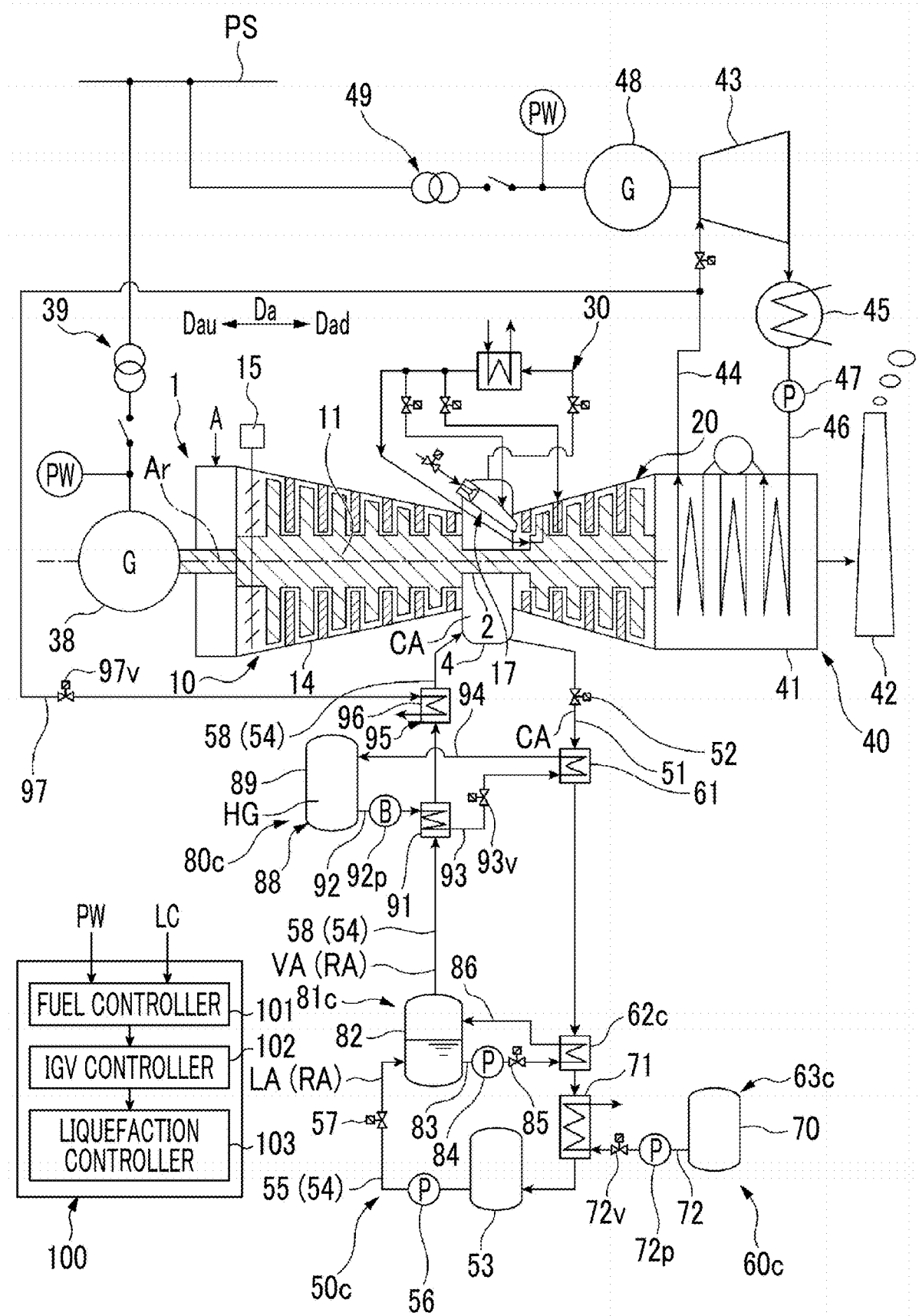
FIG. 7 is a system diagram of a gas turbine plant in a fourth embodiment of the present disclosure.

As shown in FIG. 7, the gas turbine plant of the present embodiment includes the gas turbine 1, the GT generator 38, the GT power supply facility 39, the turbine cooling device 30, the exhaust heat utilization facility 40, a liquefaction facility 50c, and the control device 100, as with the gas turbine plant of the first embodiment. However, the liquefaction facility 50c of the present embodiment is different from the liquefaction facility 50 of the first embodiment.

The liquefaction facility 50c of the present embodiment includes the bleed air line 51, the bleed air amount regulating valve 52, a liquefaction system 60c, the liquid air tank 53, a heating system 80c, the return air line 54, the liquid air pump 56, and the return amount regulating valve 57, as with the liquefaction facility 50 of the first embodiment.

The liquefaction system 60c includes the primary cooler 61, a secondary cooler 62c, a cooling device 63c, the gas-liquid separation tank 77, the liquid air supply line 78, and the liquid air supply regulating valve 79. The primary cooler 61 and the secondary cooler 62c are provided in the bleed air line 51. The primary cooler 61 can cool the compressed air CA by heat exchange between the compressed air CA and the heat storage material HG, as with the primary cooler 61 of the first embodiment. The secondary cooler 62c corresponds to the quaternary cooler 67 of the first embodiment, and can perform heat exchange between the compressed air CA cooled by the primary cooler 61 and the liquid air LA. The cooling device 63c of the present embodiment does not include the expansion turbine 65, unlike the embodiments described above. The cooling device 63c of the present embodiment includes a liquefied gas tank 70 capable of storing a liquefied gas, a first cooling heat exchanger 71 capable of performing heat exchange between the compressed air CA cooled by the secondary cooler 62c and the liquefied gas, a liquefied gas line 72 that connects a liquefied gas inlet of the first cooling heat exchanger 71 and the liquefied gas tank 70, and a liquefied gas pump 72p and a liquefied gas regulating valve 72v provided in the liquefied gas line 72.

The compressed air CA cooled by the first cooling heat exchanger 71 becomes the liquid air LA and is sent to the liquid air tank 53. The expansion valve 75 and the gas-liquid separation tank 77 in the first embodiment may be provided between the first cooling heat exchanger 71 and the liquid air tank 53.

The heating system 80c of the present embodiment includes the first heating device 81 that can heat the liquid air LA from the liquid air tank 53 to generate the vaporized air VA, the second heating device 88 that can heat the vaporized air VA from the first heating device 81, and the third heating device 95 that can heat the vaporized air VA from the second heating device 88.

The first heating device 81 includes the gas-liquid tank 82 capable of storing the liquid air LA and the vaporized air VA obtained by vaporization of the liquid air LA, the primary heater (the first heating heat exchanger) 62c, the heating liquid air line. 83, the vaporized air return line 86, the heating liquid air pump 84, and the heating liquid air regulating valve 85.

The heating liquid air line 83 connects a liquid air outlet of the gas-liquid tank 82 and a liquid air inlet of the primary heater 62c. The heating liquid air line 83 is provided with the heating liquid air pump 84 and the heating liquid air regulating valve 85. The vaporized air return line 86 connects a vaporized air outlet of the primary heater 62c and a vaporized air inlet of the gas-liquid tank 82. As with the first embodiment, the vaporization step S4 of vaporizing the liquid air LA is executed by this first heating device 81.

The primary heater (the first heating heat exchanger) 62c is a heat exchanger that performs heat exchange between the compressed air CA and the liquid air LA, and is also the secondary cooler 62c described above.

The second heating device 88 is the same as the second heating device 88 of the first embodiment. Further, the third heating device 95 is the same as the third heating device 95 of the first embodiment.

The liquefaction controller 103 of the control device 100 monitors whether the IGV opening degree θ is the first opening degree θ1 or the second opening degree θ2, as with each of the embodiments described above.

When the liquefaction controller 103 determines that the IGV opening degree θ is the first opening degree θ1, as with the first embodiment, the bleeding step S2, the liquefaction step S3, and the vaporization step S4 are executed. However, the liquefaction step S3 of the present embodiment includes a step of cooling the compressed air CA by heat exchange between the liquefied gas in the liquefied gas tank 70 and the compressed air CA flowing through the bleed air line 51. Further, when the liquefaction controller 103 determines that the IGV opening degree θ is the second opening degree θ2, as with the first embodiment, the heating step S6 of the air vaporized in the vaporization step S4 is executed.

As described above, also in the present embodiment, When the IGV opening degree θ is the first opening degree θ1, the compressed air CA in the intermediate casing 4 is bled to decrease the gas turbine output, and when the IGV opening degree θ is the second opening degree θ2, the cold vaporized air VA flows into the air flow path of the compressor 10 to increase the gas turbine output. Therefore, also in the present embodiment, it is possible to flexibly perform gas turbine output adjustment and to flexibly cope with load fluctuations in an electric power system.

Also in the present embodiment, in the liquefaction step S3, the compressed air CA is cooled by using the low-temperature thermal energy that is obtained in the vaporization step S4. Further, also in the present embodiment, in the vaporization step S4, the liquid air LA is vaporized by using the high-temperature thermal energy that is obtained in the liquefaction step S3. Therefore, also in the present embodiment, it is possible to reduce the thermal energy that is supplied from outside the liquefaction facility 50c.

In the present embodiment, in a case where it is necessary to further compress the compressed air CA when the compressed air CA is liquefied, the boost compressor 64 of the first embodiment may be provided.

Further, the present embodiment is a modification example of the first embodiment. However, the cooling device 63 of the second embodiment or the cooling device 63 of the third embodiment may be configured as with the cooling device 63c of the present embodiment.

Modification Examples

In the first embodiment, when the return air RA is supplied from the liquefaction facility 50 into the intermediate casing 4, or in the second embodiment, when the return air RA is supplied from the liquefaction facility 50a into the air flow path of the compressor casing 14, the fuel controller 101 may increase the fuel flow rate according to the flow rate of the return air RA on the condition that the following states a, b, and c are satisfied.
  a. The fuel is stably burned within the combustor 17.
  b. The combustion gas (the exhaust gas) flowing out from the combustor 17 does not exceed various regulatory values for this combustion gas.
  c. The maximum permissible temperature of the combustion gas determined from the viewpoint of protecting the high-temperature part is not exceeded.

In the embodiments described above, during the liquefaction step S3, the vaporization step S4 of vaporizing the liquid air LA by using heat obtained by cooling of the compressed air CA is also executed. However, in a case where the compressed air CA and the liquid air LA are not heat-exchanged, the vaporization step S4 may be executed in parallel with the heating step S6.

Although the liquefaction system of each of the embodiments described above includes a plurality of coolers, the number of coolers is not limited to the number exemplified in each of the embodiments described above. Further, although the heating system of each of the embodiments described above includes one or more heaters, the number of heaters is not limited to the number exemplified in the embodiments described above.

Figure 8:
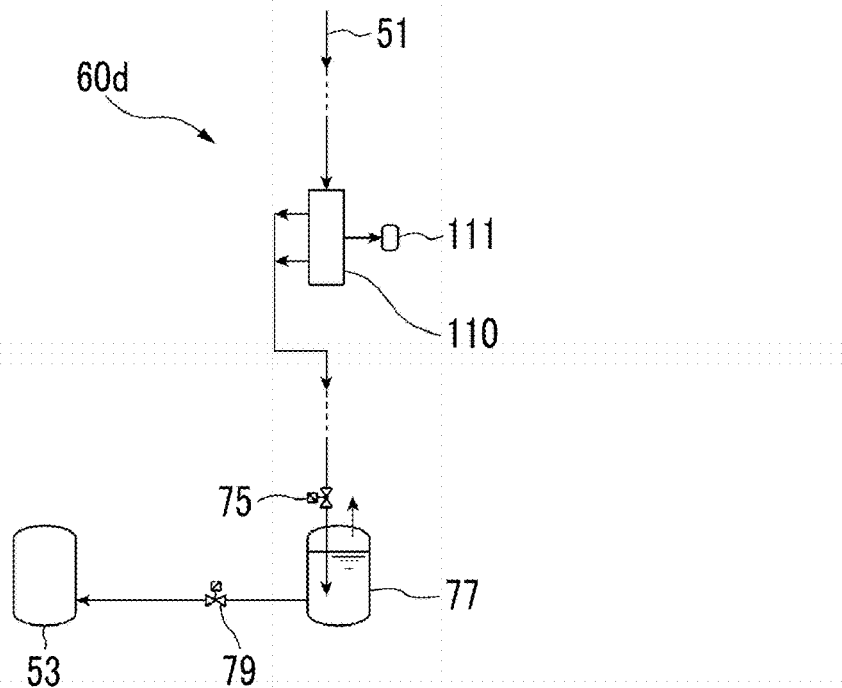
FIG. 8 is a system diagram of a modification example of a liquefaction system according to the present disclosure.

Further, the liquefaction system of each of the embodiments described above may be provided with an argon separator that separates argon from compressed air. For example, as in a liquefaction system 60d shown in FIG. 8, an argon separator 110 may be provided on an upstream side in a compressed air flow with respect to the gas-liquid separation tank 77.

Figure 9:
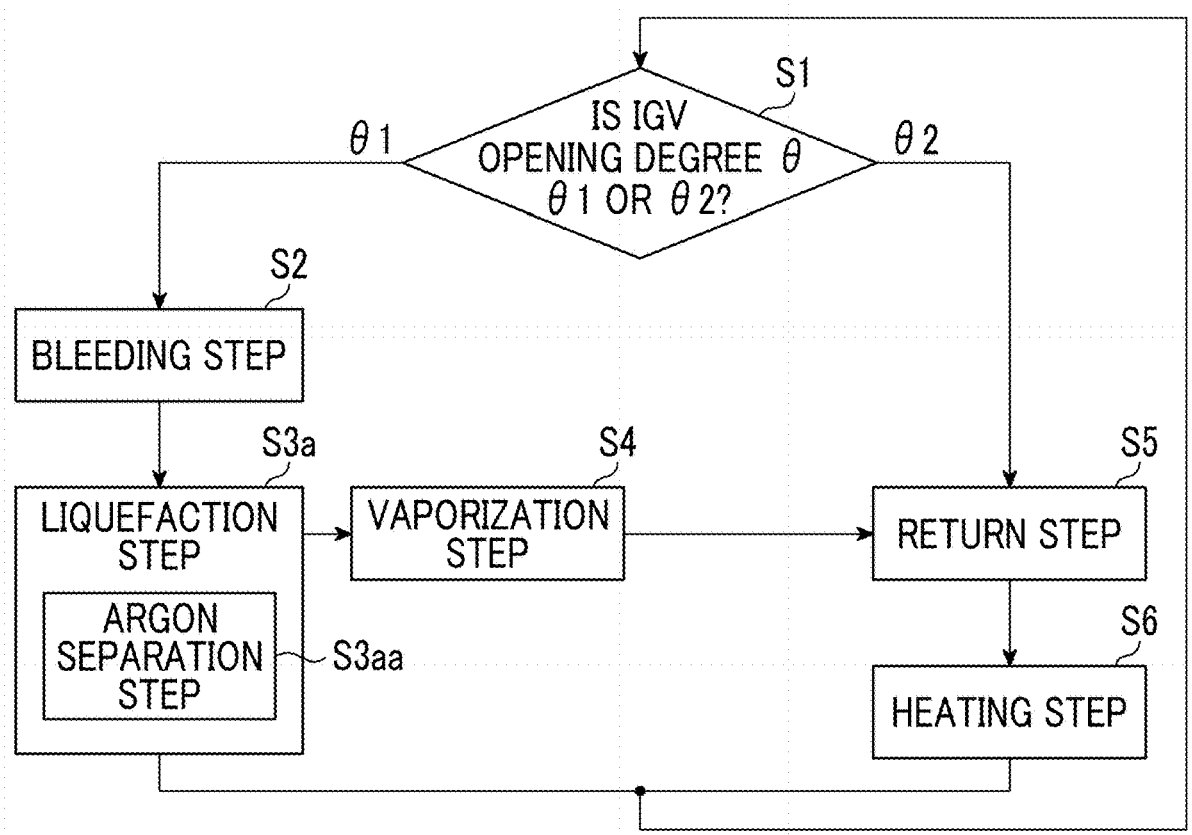
FIG. 9 is a flowchart showing an operation of a liquefaction controller for a liquefaction facility that includes the liquefaction system of the modification example shown in FIG. 8.

The argon separator 110 separates argon from compressed air by using a cryogenic separation method. The cryogenic separation method is a method of separating a specific type of gas by utilizing a difference in boiling point of each of a plurality of types of gases that configure the compressed air. For example, the boiling point of oxygen is −183° C., the boiling point of argon is −185.8° C., and the boiling point of nitrogen is −195.8° C. In the example shown in FIG. 8, the argon separator 110 separates argon from compressed air by cryogenic separation. That is, as shown in FIG. 9, a liquefaction step S3a includes an argon separation step S3aa, and in the argon separation step S3aa, argon in the exhaust gas is cryogenically separated. The argon separated by the argon separator 110 is sent to, for example, an argon recovery tank 111. Further, the compressed air from which argon has been removed is further cooled and then sent to the gas-liquid separation tank 77 through the expansion valve 75, or is directly sent to the gas-liquid separation tank 77 through the expansion valve 75. Here, the main components of the compressed air from which argon has been removed are nitrogen and oxygen.

The gas turbine plant of each of the embodiments described above includes two generators: the GT generator 38 that generates electricity by driving of the gas turbine 1 and the ST generator 48 that generates electricity by driving of the steam turbine 43. However, the gas turbine plant may include only one generator. In this case, one generator can generate electricity by either the driving of the gas turbine 1 or the driving of the steam turbine 43.

The gas turbine plant of each of the embodiments described above includes the exhaust heat utilization facility 40. However, the gas turbine plant does not need to include the exhaust heat utilization facility 40.

The gas turbine plant of each of the embodiments described above is a gas turbine plant as a completed plant. Incidentally, in a case where a gas turbine plant does not include the liquefaction facility and the liquefaction controller in each of the embodiments described above, the gas turbine plant may be modified by executing a step of adding the liquefaction facility and the liquefaction controller in each of the embodiments described above. Since the control device 100 in the gas turbine plant of each of the embodiments described above is a computer, in a case where the liquefaction controller 103 is added in the modification of the gas turbine plant, it is favorable if a program for making the computer function as the liquefaction controller 103 is installed in the computer.

Additional Remarks

The gas turbine plants in the embodiments and modification examples described above can be understood as follows, for example.
  (1) A gas turbine plant in a first aspect includes:
  the gas turbine 1 that includes the compressor 10 capable of compressing air, the combustor 17 capable of generating a combustion gas by burning fuel in the compressed air CA that is air compressed by the compressor 10, and the turbine 20 capable of being driven by the combustion gas; the liquefaction facility 50, 50a, 50b, or 50c capable of liquefying gaseous air; and the liquefaction controller 103 that controls the liquefaction facility 50, 50a, 50b, or 50c. The compressor 10 includes the compressor rotor 11 rotatable around an axis line, the compressor casing 14 that covers the outer periphery of the compressor rotor 11, the plurality of stator blades 12v provided on the inner periphery side of the compressor casing 14, and the intake air amount regulator 15 capable of regulating an intake air amount, which is a flow rate of air flowing into the compressor casing 14, by an opening and closing operating. The liquefaction facility 50, 50a, 50b, or 50c includes the bleed air line 51 capable of bleeding part of the compressed air CA from the compressor 10, the liquefaction system 60, 60a, or 60c capable of liquefying the compressed air CA flowing through the bleed air line 51, the bleed air amount regulating valve 52 capable of regulating the flow rate of the compressed air CA flowing through the bleed air line 51, the liquid air tank 53 capable of storing the liquid air LA which is the compressed air CA liquefied in the liquefaction system 60, 60a, or 60c, the return air line 54, 54a, 54aa, or 54b capable of leading the return air RA, which is the liquid air LA in the liquid air tank 53 or the vaporized air VA obtained by vaporization of the liquid air LA, to a flow path through which air or compressed air CA flows in the gas turbine 1, or to a high-temperature part which comes into contact with the combustion gas, among parts configuring the gas turbine 1, and the return amount regulating valve 57 capable of regulating the flow rate of the return air RA flowing through the return air line 54, 54a, 54aa, or 54b. The liquefaction controller 103 is configured to lead the compressed air CA to the liquefaction system 60, 60a, or 60c by opening the bleed air amount regulating valve 52 when the opening degree of the intake air amount regulator 15 is the first opening degree $\theta 1$ or when a parameter having a correlation with the opening degree is a value corresponding to the first opening degree $\theta 1$, and lead the return air RA to the gas turbine 1 by opening the return amount regulating valve 57 when the opening degree of the intake air amount regulator 15 is the second opening degree $\theta 2$, which is an opening degree larger than the first opening degree $\theta 1$, or when the parameter is a value corresponding to the second opening degree $\theta 2$. The first opening degree $\theta 1$ is an opening degree when the amount of intake air flowing into the compressor casing 14 is made smaller than the amount of intake air when the output of the gas turbine 1 is the rated output.

In this aspect, part of the compressed air CA from the compressor 10 is bled to the liquefaction facility 50, 50a, 50b, or 50c at the first opening degree $\theta 1$ when the intake air amount is made smaller than the intake air amount when the output of the gas turbine 1 is the rated output. Therefore, the flow rate of the compressed air CA flowing into the combustor 17 from the intermediate casing 4 decreases. Therefore, in this aspect, the flow rate of the combustion gas that is generated in the combustor 17 becomes smaller than in a case where the compressed air CA from the compressor 10 is not bled at the first opening degree $\theta 1$, and the gas turbine output decreases.

Further, in this aspect, at the second opening degree $\theta 2$ which is an opening degree larger than the first opening degree $\theta 1$, the return air RA, which is the liquid air LA in the liquid air tank 53 or vaporized air of the liquid air, LA is led to a flow path through which air or compressed air CA flows in the gas turbine 1, or to the high-temperature part which comes into contact with the combustion gas, among parts configuring the gas turbine 1. For example, in a case where at the second opening degree $\theta 2$, the return air RA is led to the flow path through which air or compressed air flows in the gas turbine 1, the flow rate of the combustion gas that is generated in the combustor 17 becomes larger than in a case where the return air RA is not led to the flow path, and the gas turbine output increases. Further, in a case where at the second opening degree $\theta 2$, the return air RA is led to the high-temperature part of the gas turbine 1, the flow rate of the compressed air CA for cooling the high-temperature part becomes smaller than in a case where the return air RA is not led to the high-temperature part, the flow rate of air flowing into the combustor 17 increases, and the gas turbine output increases.

Therefore, in this aspect, it is possible to flexibly perform gas turbine output adjustment and to flexibly cope with load fluctuations in an electric power system.

(2) In a gas turbine plant in a second aspect, in the gas turbine plant in the first aspect, the first opening degree $\theta 1$ is the minimum opening degree min capable of minimizing the amount of intake air flowing into the compressor casing 14.

(3) In a gas turbine plant in a third aspect, in the gas turbine plant in the first or second aspect, the second opening degree $\theta 2$ is the maximum opening degree max capable of maximizing the amount of intake air flowing into the compressor casing 14.

(4) In a gas turbine plant in a fourth aspect, in the gas turbine plant in any one of the first to third aspects, the liquefaction system 60 or 60a includes the cooling device 63 capable of cooling the compressed air CA from the bleed air line 51. The cooling device 63 includes the boost compressor 64 capable of further compressing the compressed air CA from the bleed air line 51 to generate the highly compressed air HCA, the expansion turbine 65 capable of adiabatically expanding part of the highly compressed air HCA to generate the low-temperature and low-pressure air LLA, and the first cooling heat exchanger 67 capable of cooling the highly compressed air HCA by performing heat exchange between other part of the highly compressed air HCA and the low-temperature and low-pressure air LLA.

(5) In a gas turbine plant in a fifth aspect, in the gas turbine plant in any one of the first to third aspects, the liquefaction system 60c includes the cooling device 63c capable of cooling the compressed air CA from the bleed air line 51. The cooling device 63c includes the liquefied gas tank 70 capable of storing a liquefied gas, and the first cooling heat exchanger 71 capable of cooling the compressed air CA by performing heat exchange between the compressed air CA flowing through the bleed air line 51 and the liquefied gas.

(6) In a gas turbine plant in a sixth aspect, in the gas turbine plant in the fourth or fifth aspect, the liquefaction facility 50, 50a, 50b, or 50c includes the heating system 80, 80a, 80b, or 80c that heats the liquid air LA from the liquid air tank 53.

(7) In a gas turbine plant in a seventh aspect, in the gas turbine plant in the sixth aspect, the heating system 80, 80a, 80b, or 80c includes the first heating device 81 or 81c capable of heating the liquid air LA from the liquid air tank 53 to generate the vaporized air VA obtained by vaporization of the liquid air LA.

(8) In a gas turbine plant in an eighth aspect, in the gas turbine plant in the seventh aspect, the first heating device 81 or 81c includes the gas-liquid tank 82 capable of storing the liquid air LA and the vaporized air VA, and the first heating heat exchanger 67 or 62c capable of performing heat exchange between the liquid air LA in the gas-liquid tank 82 and the compressed air CA to heat the liquid air LA while returning the liquid air LA as the vaporized air VA to the gas-liquid tank 82 and to cool the compressed air CA. The liquefaction system 60, 60a, or 60c includes the first heating heat exchanger 67 or 62c as a cooling heat exchanger capable of cooling the compressed air CA.

In this aspect, in the process of cooling the compressed air CA in the liquefaction system 60, 60a, or 60c, the compressed air CA can be cooled by using the low-temperature thermal energy that is obtained in the process of heating the liquid air LA or the vaporized air VA in the heating system 80, 80a, 80b, or 80c. Further, in this aspect, in the process of heating the liquid air LA or the vaporized air VA in the heating system 80, 80a, 80b, or 80c, the liquid air LA or the vaporized air VA can be heated by using the high-temperature thermal energy that is obtained in the process of cooling the compressed air CA in the liquefaction system 60, 60a, or 60c. Therefore, in this aspect, it is possible to reduce the thermal energy that is supplied from outside the liquefaction facility 50, 50a, 50b, or 50c.

(9) In a gas turbine plant in a ninth aspect,
in the gas turbine plant in the fourth aspect, the liquefaction facility 50 or 50b includes the heating system 80 or 80b that heats the liquid air LA from the liquid air tank 53. The heating system 80 or 80b includes the first heating device 81 capable of heating the liquid air LA from the liquid air tank 53 to generate the vaporized air VA obtained by vaporization of the liquid air LA.

The first heating device 81 includes the gas-liquid tank 82 capable of storing the liquid air LA and the vaporized air VA, and the first heating heat exchanger 67 capable of performing heat exchange between the liquid air LA from the gas-liquid tank 82 and the other part of the highly compressed air HCA from the boost compressor 64 to heat the liquid air LA while returning the liquid air LA as the vaporized air VA to the gas-liquid tank 82 and to cool the other part of the highly compressed air HCA. The liquefaction system 60 includes the first heating heat exchanger 67 as the first cooling heat exchanger 67. The first heating heat exchanger 67 as the first cooling heat exchanger 67 is capable of performing heat exchange between the liquid air LA from the gas-liquid tank 82 and the low-temperature and low-pressure air LLA from the expansion turbine 65, and the other part of the highly compressed air HCA from the boost compressor 64.

In this aspect, in the process of cooling the compressed air CA in the liquefaction system 60, the compressed air CA can be cooled by using the low-temperature thermal energy that is obtained in the process of heating the liquid air LA or the vaporized air VA in the heating system 80 or 80b. Further, in this aspect, in the process of heating the liquid air LA or the vaporized air VA in the heating system 80 or 80b, the liquid air LA or the vaporized air VA can be heated by using the high-temperature thermal energy that is obtained in the process of cooling the compressed air CA in the liquefaction system 60. Therefore, in this aspect, it is possible to reduce the thermal energy that is supplied from outside the liquefaction facility 50 or 50b.

(10) In a gas turbine plant in a tenth aspect,
in the gas turbine plant in any one of the seventh to ninth aspects, the heating system 80, 80b, or 80c includes the second heating device 88 capable of heating the vaporized air VA from the first heating device 81.

(11) In a gas turbine plant in an eleventh aspect,
in the gas turbine plant in the tenth aspect, the liquefaction system 60 or 60c includes the second cooling heat exchanger 61 capable of performing heat exchange between the heat storage material HG and the compressed air CA before reaching the cooling device 63 or 63c to heat the heat storage material HG and cool the compressed air CA. The second heating device 88 includes the heat storage tank 89 capable of storing the heat storage material HG heated by the second cooling heat exchanger 61, and the second heating heat exchanger 91 capable of performing heat exchange between the heat storage material HG from the heat storage tank 89 and the vaporized air VA from the first heating device 81 to heat the vaporized air VA and cool the heat storage material HG. The second cooling heat exchanger 61 is capable of performing heat exchange between the compressed air CA before reaching the cooling device 63 and the heat storage material HG cooled in the second heating heat exchanger 91.

In this aspect, in the process of cooling the compressed air CA in the liquefaction system 60 or 60c, the compressed air CA can be cooled by using the low-temperature thermal energy that is obtained in the process of heating the vaporized air VA in the heating system 80, 80b, or 80c. Further, in this aspect, in the process of heating the vaporized air VA in the heating system 80, 80b, or 80c, the liquid air LA or the vaporized air VA can be heated by using the high-temperature thermal energy that is obtained in the process of cooling the compressed air CA in the liquefaction system 60 or 60c. Therefore, in this aspect, it is possible to reduce the thermal energy that is supplied from outside the liquefaction facility 50, 50b, or 50c.

(12) In a gas turbine plant in a twelfth aspect,
in the gas turbine plant in the eleventh aspect, the heating system 80 or 80c includes the third heating device 95 capable of heating the vaporized air VA from the second heating device 88.

The return air line 54 is capable of leading the vaporized air VA heated by the third heating device 95, as the return air RA, to a flow path through which the compressed air CA flows in the gas turbine 1.

In this aspect, at the second opening degree O2 that is larger than the first opening degree O1, the temperature of the return air RA that is led to the flow path through which the compressed air CA flows in the gas turbine 1 can be increased.

Therefore, in this aspect, even in a case where the return air RA is not heated by the third heating device 95, the temperature of the air flowing into the combustor 17 increases, and the gas turbine output increases.

(13) In a gas turbine plant in a thirteenth aspect,
the gas turbine plant in the twelfth aspect further includes the exhaust heat recovery boiler 41 capable of generating steam by using the heat of an exhaust gas, which is a combustion gas that is exhausted from the gas turbine 1. The third heating device 95 includes the third heating heat exchanger 96 capable of heating the vaporized air VA by performing heat exchange between the vaporized air VA from the second heating device 88 and the steam from the exhaust heat recovery boiler 41.

In this aspect, the vaporized air VA can be heated by using the high-temperature thermal energy obtained within the gas turbine plant. Therefore, in this aspect, it is possible to reduce the thermal energy that is supplied from outside the gas turbine plant.

(14) In a gas turbine plant in a fourteenth aspect,
in the gas turbine plant in any one of the first to thirteenth aspects, the liquefaction system 60d includes the argon separator 110 capable of cryogenically separating argon in the compressed air CA in a liquefaction process of the compressed air CA in the liquefaction system 60d.

In this aspect, it is possible to separate argon from the compressed air CA in the liquefaction process of the compressed air CA.

(15) In a gas turbine plant in a fifteenth aspect,
in the gas turbine plant in any one of the first to fourteenth aspects, the return air line 54 is capable of leading the return air RA to a flow path through which the compressed air CA flows in the gas turbine 1.

In this aspect, at the second opening degree θ2 that is an opening degree larger than the first opening degree θ1, the return air RA can be led to the flow path through which the compressed air CA flows in the gas turbine 1. Therefore, in this aspect, the flow rate of the combustion gas that is generated in the combustor 17 becomes larger than in a case where the return air RA is not led to this flow path, and the gas turbine output increases.

(16) In a gas turbine plant in a sixteenth aspect,
in the gas turbine plant in any one of the first to eleventh aspects, the return air line 54a or 54aa is capable of leading the return air RA into an air flow path through which air in the compressor casing 14 flows.

In this aspect, at the second opening degree θ2 that is an opening degree larger than the first opening degree θ1, the return air RA can be led to an air flow path in the compressor casing 14. Therefore, at the second opening degree θ2, the average temperature of the air flowing through the air flow path decreases. Even if the volume flow rate of the air flowing through the air flow path does not change, when the average temperature of the air flowing through the air flow path decreases, the mass flow rate of the air flowing through the air flow path increases. Therefore, in this aspect, at the second opening degree θ2, the mass flow rate of the combustion gas that is generated in the combustor 17 becomes larger than in a case where cold vaporized air VA does not flow into the air flow path of the compressor 10, and the gas turbine output increases.

(17) In a gas turbine plant in a seventeenth aspect,
in the gas turbine plant in the sixteenth aspect, the return air line 54 is capable of leading the return air RA to a flow path portion through which air before an intake air amount is regulated by the intake air amount regulator 15 flows, of the air flow path in the compressor casing 14.

(18) In a gas turbine plant in an eighteenth aspect,
in the gas turbine plant in the sixteenth aspect, an air passage 13 that passes through the stator blade 12v and is open at a surface of the stator blade 12v is formed in at least one of the plurality of stator blades 12v of the compressor 10, and the return air line 54aa is capable of leading the return air RA into the air passage 13 of the stator blade 12v.

(19) In a gas turbine plant in a nineteenth aspect,
in the gas turbine plant in the eighteenth aspect, the return air line 54aa is capable of leading the liquid air LA as the return air RA into the air passage 13 of the stator blade 12v.

(20) In a gas turbine plant in a twentieth aspect,
in the gas turbine plant in the first to ninth aspects, a cooling air passage 23 that passes through the high-temperature part and is open at a surface of the high-temperature part, which comes into contact with the combustion gas, is formed in the high-temperature part. The return air line 54b is capable of leading the return air RA to the cooling air passage 23 of the high-temperature part.

In this aspect, at the second opening degree θ2 which is an opening degree larger than the first opening degree θ1, the return air RA can be led to the high-temperature part of the gas turbine 1. Therefore, at the second opening degree θ2, the flow rate of the compressed air CA for cooling the high-temperature part becomes smaller than in a case where the return air RA is not led to the high-temperature part, so that the flow rate of the air flowing into the combustor 17 increases and the gas turbine output increases.

The method for operating the gas turbine plants in the embodiments and modification examples described above can be understood as follows, for example.

(21) A method for operating a gas turbine plant in a twenty-first aspect is applied to the following gas turbine plant.

The gas turbine plant includes the gas turbine 1. The gas turbine 1 includes the compressor 10 capable of compressing air, the combustor 17 capable of generating combustion gas by burning fuel in the compressed air CA that is air compressed by the compressor 10, and the turbine 20 capable of being driven by the combustion gas. The compressor 10 includes the compressor rotor 11 rotatable around an axis line, the compressor casing 14 that covers the outer periphery of the compressor rotor 11, the plurality of stator blades 12v provided on the inner periphery side of the compressor casing 14, and the intake air amount regulator 15 capable of regulating an intake air amount, which is a flow rate of air flowing into the compressor casing 14, by an opening and closing operating.

The operating method includes the bleeding step S2 of bleeding part of the compressed air CA from the compressor 10, the liquefaction step S3 of liquefying the compressed air CA bled in the bleeding step S2 to generate the liquid air LA, and the return step S5 of leading the return air RA, which is the liquid air LA or the vaporized air VA obtained by vaporization of the liquid air LA, to a flow path through which air or compressed air CA flows in the gas turbine 1, or to the high-temperature part which comes into contact with the combustion gas, among parts configuring the gas turbine 1. When the opening degree of the intake air amount regulator 15 is the first opening degree θ1 or when a parameter having a correlation with the opening degree is a value corresponding to the first opening degree θ1, the bleeding step S2 and the liquefaction step S3 are executed. When the opening degree of the intake air amount regulator 15 is the second opening degree θ2 larger than the first opening degree θ1 or when the parameter is a value corresponding to the second opening degree θ2, the return step S5 is executed. The first opening degree θ1 is an opening degree when the amount of intake air flowing into the compressor casing 14 is made smaller than the amount of intake air when the output of the gas turbine 1 is the rated output.

By performing the operating method of this aspect, as with the gas turbine plant in the first aspect, it is possible to flexibly perform gas turbine output adjustment and to flexibly cope with load fluctuations in an electric power system.

(22) In a method for operating a gas turbine plant in a twenty-second aspect,
in the method for operating a gas turbine plant in the twenty-first aspect, the first opening degree θ1 is the minimum opening degree min capable of minimizing the amount of intake air flowing into the compressor casing 14.

(23) In a method for operating a gas turbine plant in a twenty-third aspect,
in the method for operating a gas turbine plant in the twenty-first or twenty-second aspect, the second opening degree θ2 is the maximum opening degree max capable of maximizing the amount of intake air flowing into the compressor casing 14.

(24) In a method for operating a gas turbine plant in a twenty-fourth aspect,
in the method for operating a gas turbine plant in any one of the twenty-first to twenty-third aspects, the liquefaction step S3a includes the argon separation step S3aa of cryogenically separating argon in the compressed air CA in a liquefaction process of the compressed air CA.

In this aspect, it is possible to separate argon from the compressed air CA in the liquefaction process of the compressed air CA.

The method for modifying the gas turbine plants in the embodiments and modification examples described above can be understood as follows, for example.

(25) A method for modifying a gas turbine plant in a twenty-fifth aspect is applied to the following gas turbine plant.

The gas turbine plant includes the gas turbine 1. The gas turbine 1 includes the compressor 10 capable of compressing air, the combustor 17 capable of generating combustion gas by burning fuel in the compressed air CA that is air compressed by the compressor 10, and the turbine 20 capable of being driven by the combustion gas. The compressor 10 includes the compressor rotor 11 rotatable around an axis line, the compressor casing 14 that covers the outer periphery of the compressor rotor 11, the plurality of stator blades 12v provided on the inner periphery side of the compressor casing 14, and the intake air amount regulator 15 capable of regulating an intake air amount, which is a flow rate of air flowing into the compressor casing 14, by an opening and closing operating.

The modifying method includes a step of adding the liquefaction facility 50, 50a, 50b, or 50c capable of liquefying gaseous air, and the liquefaction controller 103 capable of controlling the liquefaction facility 50. The liquefaction facility 50, 50a, 50b, or 50c that is added in the step includes the bleed air line 51 capable of bleeding part of the compressed air CA from the compressor 10, the liquefaction system 60, 60a, or 60c capable of liquefying the compressed air CA flowing through the bleed air line 51, the liquid air tank 53 capable of storing the liquid air LA which is the compressed air CA liquefied in the liquefaction system 60, 60a, or 60c, the bleed air amount regulating valve 52 capable of regulating the flow rate of the compressed air CA flowing through the bleed air line 51, the return air line 54, 54a, 54aa, or 54b capable of leading the return air RA, which is the liquid air LA in the liquid air tank 53 or the vaporized air VA obtained by vaporization of the liquid air LA, to a flow path through which air or the compressed air CA flows in the gas turbine 1, or to the high-temperature part which comes into contact with the combustion gas, among parts configuring the gas turbine 1, and the return amount regulating valve 57 capable of regulating the flow rate of the return air RA flowing through the return air line 54, 54a, 54aa, or 54b. The liquefaction controller 103 that is added in the step is configured to lead the compressed air CA to the liquefaction system 60, 60a, or 60c by opening the bleed air amount regulating valve 52 when the opening degree of the intake air amount regulator 15 is the first opening degree θ1 or when a parameter having a correlation with the opening degree is a value corresponding to the first opening degree θ1, and lead the return air RA to the gas turbine 1 by opening the return amount regulating valve 57 when the opening degree of the intake air amount regulator 15 is the second opening degree θ2, which is an opening degree larger than the first opening degree θ1, or when the parameter is a value corresponding to the second opening degree θ2. The first opening degree θ1 is an opening degree when the amount of intake air flowing into the compressor casing 14 is made smaller than the amount of intake air when the output of the gas turbine 1 is the rated output.

In the gas turbine plant modified by the modifying method of this aspect, as with the gas turbine plant in the first aspect, it is possible to flexibly perform gas turbine output adjustment and to flexibly cope with load fluctuation in an electric power system.

(26) In a method for modifying a gas turbine plant in a twenty-sixth aspect, in the method for modifying a gas turbine plant in the twenty-fifth aspect, the liquefaction system 60d includes the argon separator 110 capable of cryogenically separating argon in the compressed air CA in a liquefaction process of the compressed air CA in the liquefaction system 60d.

In this aspect, it is possible to separate argon from the compressed air CA in the liquefaction process of the compressed air CA.

INDUSTRIAL APPLICABILITY

In an aspect of the present disclosure, it is possible to flexibly perform gas turbine output adjustment and to flexibly cope with load fluctuations in an electric power system.

REFERENCE SIGNS LIST

1: gas turbine
2: gas turbine rotor
3: gas turbine casing
4: intermediate casing
5: fuel line
6: fuel regulating valve
10: compressor
11: compressor rotor
11a: compressor rotor shaft
11t: rotor blade row
11b: rotor blade
12t: stator blade row
12v: stator blade
12f: front end
12r: rear end
13: air passage
14: compressor casing
15: intake air amount regulator (IGV)
15v: guide vane
15d: driver
17: combustor
17c: combustion tube (or transition piece)
17m: fuel nozzle
20: turbine
21: turbine rotor
21a: turbine rotor shaft
21ap: cooling air passage
21t: rotor blade row
21b: rotor blade
22t: stator blade row
22v: stator blade
23: cooling air passage
24: turbine casing
30: turbine cooling device
31: cooling bleed air line
31v: cooling bleed air amount regulating valve
32: cooler
33: cooling air line
33m: main cooling air line
33c: combustor cooling air line
33b: rotor blade cooling air line
33v: stator blade cooling air line
34: cooling air regulating valve
38: GT generator 39: GT power supply facility
39a: GT power line
39b: GT circuit breaker
39t: GT transformer
39m: GT wattmeter
40: exhaust heat utilization facility
41: exhaust heat recovery boiler
41d: duct
41t: heat transfer tube
42: chimney
43: steam turbine
44: main steam line
45: condenser
46: water supply line
47: water supply pump
48: ST generator
49: ST power supply facility
49a: ST power line
49b: ST circuit breaker
49t: ST transformer
49m: ST wattmeter
50, 50a, 50b, 50c: liquefaction facility
51: bleed air line
52: bleed air amount regulating valve
53: liquid air tank
54, 54a, 54b: return air line
55, 55a: liquid air line
56: liquid air pump
57: return amount regulating valve
58, 58a, 58aa, 58b: vaporized air line
60, 60a, 60c, 60d: liquefaction system
61: primary cooler (second cooling heat exchanger)
62: secondary cooler
62a: primary cooler
62c: Secondary cooler (first heating heat exchanger)
63, 63c: cooling device
64: boost compressor
65: expansion turbine
66: tertiary cooler
67: quaternary cooler (first cooling heat exchanger)
68m: Highly compressed air main line
68b: Highly compressed air branch line
68v: highly compressed air regulating valve
69m: low-temperature and low-pressure air main line
69b: low-temperature and low-pressure air branch line
70: liquefied gas tank
71: first cooling heat exchanger
72: liquefied gas line
72p: liquefied gas pump
72v: liquefied gas regulating valve
74: gas-liquid mixing line
75: expansion valve
77: gas-liquid separation tank
78: liquid air supply line
79: liquid air supply regulating valve
80, 80a, 80b, 80c: heating system
81: first heating device
82: gas-liquid tank
62c: primary heater (first heating heat exchanger)
67: primary heater (first heating heat exchanger)
83: heating liquid air line
84: heating liquid air pump
85: heating liquid air regulating valve
86: vaporized air return line
88: second heating device
89: heat storage tank
91: secondary heater (second heating heat exchanger)
92: heat storage material supply line
92p: heat storage material feeder
93: high-temperature heat storage material line
93v: heat storage material regulating valve
94: low-temperature heat storage material line
95: third heating device
96: tertiary heater (third heating heat exchanger)
97: branch steam line
97v: branch steam regulating valve
100: control device
101: fuel controller
102: IGV controller
103: liquefaction controller
110: argon separator
111: argon recovery tank
PS: electric power system
CA: compressed air
HCA: highly compressed air
LLA: low-temperature and low-pressure air
A: air
RA: return air
LA: liquid air
VA: vaporized air
HG: heat storage material
Ar: rotor axis line
Da: axis line direction
Dau: axis line upstream side
Dad: axis line downstream side

The invention claimed is:

1. A gas turbine plant comprising:
a gas turbine that includes a compressor capable of compressing air, a combustor capable of generating a combustion gas by burning fuel in compressed air that is the air compressed by the compressor, and a turbine capable of being driven by the combustion gas;
a liquefaction facility capable of liquefying gaseous air; and
a liquefaction controller that controls the liquefaction facility, wherein the compressor includes a compressor rotor rotatable around an axis line, a compressor casing that covers an outer periphery of the compressor rotor, a plurality of stator blades provided on an inner periphery side of the compressor casing, and an intake air amount regulator capable of regulating an intake air amount, which is a flow rate of the air flowing into the compressor casing, by an opening operation and a closing operation,
the liquefaction facility includes
a bleed air line capable of bleeding part of the compressed air from the compressor,
a liquefaction system capable of liquefying the compressed air flowing through the bleed air line,
a bleed air amount regulating valve capable of regulating a flow rate of the compressed air flowing through the bleed air line,
a liquid air tank capable of storing liquid air which is the compressed air liquefied in the liquefaction system,
a return air line capable of leading return air, which is the liquid air in the liquid air tank or vaporized air obtained by vaporization of the liquid air, to a flow path through which the air or the compressed air flows in the gas turbine, or to a high-temperature part which comes into contact with the combustion gas, among parts configuring the gas turbine, and
a return amount regulating valve capable of regulating a flow rate of the return air flowing through the return air line, the liquefaction controller is configured to lead the compressed air to the liquefaction system by opening the bleed air amount regulating valve when an opening degree of the intake air amount regulator is a first opening degree or when a parameter having a correlation with the opening degree is a value corresponding to the first opening degree, and lead the return air to the gas turbine by opening the return amount regulating valve when the opening degree of the intake air amount regulator is a second opening degree, which is an opening degree larger than the first opening degree, or when the parameter is a value corresponding to the second opening degree, and wherein the first degree opening has an amount of an intake air flowing into the compressor casing that is smaller than the amount of the intake air when the output of the gas turbine is a rated output.

2. The gas turbine plant according to claim 1,
wherein the first opening degree is a minimum opening degree capable of minimizing the amount of the intake air flowing into the compressor casing.

3. The gas turbine plant according to claim 1,
wherein the second opening degree is a maximum opening degree capable of maximizing the amount of the intake air flowing into the compressor casing.

4. The gas turbine plant according to claim 1,
wherein the liquefaction system includes a cooling device capable of cooling the compressed air from the bleed air line, and
the cooling device includes
a boost compressor capable of further compressing the compressed air from the bleed air line to generate highly compressed air,
an expansion turbine capable of adiabatically expanding part of the highly compressed air to generate a low-temperature and low-pressure air, and
a first cooling heat exchanger capable of cooling the highly compressed air by performing heat exchange between other part of the highly compressed air and the low-temperature and low-pressure air.

5. The gas turbine plant according to claim 1,
wherein the liquefaction system includes a cooling device capable of cooling the compressed air from the bleed air line, and
the cooling device includes
a liquefied gas tank capable of storing a liquefied gas, and
a first cooling heat exchanger capable of cooling the compressed air by performing heat exchange between the compressed air flowing through the bleed air line and the liquefied gas.

6. The gas turbine plant according to claim 4,
wherein the liquefaction facility includes a heating system that heats the liquid air from the liquid air tank.

7. The gas turbine plant according to claim 6,
wherein the heating system includes a first heating device capable of heating the liquid air from the liquid air tank to generate the vaporized air obtained by vaporization of the liquid air.

8. The gas turbine plant according to claim 7,
wherein the first heating device includes
a gas-liquid tank capable of storing the liquid air and the vaporized air, and
a first heating heat exchanger capable of performing heat exchange between the liquid air in the gas-liquid tank and the compressed air to heat the liquid air while returning the liquid air as the vaporized air to the gas-liquid tank and to cool the compressed air, and the liquefaction system includes the first heating heat exchanger as a cooling heat exchanger capable of cooling the compressed air.

9. The gas turbine plant according to claim 4,
wherein the liquefaction facility includes a heating system that heats the liquid air from the liquid air tank,
the heating system includes a first heating device capable of heating the liquid air from the liquid air tank to generate the vaporized air that is obtained by vaporization of the liquid air,
the first heating device includes
a gas-liquid tank capable of storing the liquid air and the vaporized air, and
a first heating heat exchanger capable of performing heat exchange between the liquid air from the gas-liquid tank and the other part of the highly compressed air from the boost compressor to heat the liquid air while returning the liquid air as the vaporized air to the gas-liquid tank and to cool the other part of the highly compressed air,
the liquefaction system includes the first heating heat exchanger as the first cooling heat exchanger, and
the first heating heat exchanger as the first cooling heat exchanger is capable of performing heat exchange between the liquid air from the gas-liquid tank and the low-temperature and low-pressure air from the expansion turbine, and the other part of the highly compressed air from the boost compressor.

10. The gas turbine plant according to claim 7,
wherein the heating system includes a second heating device capable of heating the vaporized air from the first heating device.

11. The gas turbine plant according to claim 10,
wherein the liquefaction system includes a second cooling heat exchanger capable of performing heat exchange between a heat storage material and the compressed air before reaching the cooling device to heat the heat storage material and to cool the compressed air,
the second heating device includes
a heat storage tank capable of storing the heat storage material heated by the second cooling heat exchanger, and
a second heating heat exchanger capable of performing heat exchange between the heat storage material from the heat storage tank and the vaporized air from the first heating device to heat the vaporized air and to cool the heat storage material, and
the second cooling heat exchanger is capable of performing heat exchange between the compressed air before reaching the cooling device and the heat storage material cooled in the second heating heat exchanger.

12. The gas turbine plant according to claim 11,
wherein the heating system includes a third heating device capable of heating the vaporized air from the second heating device, and
the return air line is capable of leading the vaporized air heated by the third heating device, as the return air, to the flow path through which the compressed air flows in the gas turbine.

13. The gas turbine plant according to claim 12, further comprising:
an exhaust heat recovery boiler capable of generating steam by using heat of an exhaust gas, which is the combustion gas that is exhausted from the gas turbine,
wherein the third heating device includes a third heating heat exchanger capable of heating the vaporized air by performing heat exchange between the vaporized air from the second heating device and the steam from the exhaust heat recovery boiler.

14. The gas turbine plant according to claim 1,
wherein the liquefaction system includes an argon separator capable of cryogenically separating argon in the compressed air in a liquefaction process of the compressed air in the liquefaction system.

15. The gas turbine plant according to claim 1,
wherein the return air line is capable of leading the return air into an air flow path through which the air in the compressor casing flows.

16. The gas turbine plant according to claim 15,
wherein the return air line is capable of leading the return air to a flow path portion through which the air before an intake air amount is regulated by the intake air amount regulator flows, of the air flow path in the compressor casing.

17. The gas turbine plant according to claim 15,
wherein an air passage is formed in and passes through a stator blade of the plurality of stator blades and is open at a surface of the stator blade, and the return air line is capable of leading the return air into the air passage of the stator blade.

18. The gas turbine plant according to claim 17,
wherein the return air line is capable of leading the liquid air as the return air into the air passage of the stator blade.

* * * * *